United States Patent
Chang et al.

(10) Patent No.: US 12,162,035 B2
(45) Date of Patent: Dec. 10, 2024

(54) PRINT HEAD FOR PRINTING NANOMATERIALS

(71) Applicant: Oregon State University, Corvallis, OR (US)

(72) Inventors: Chih-hung Chang, Corvallis, OR (US); Venkata Vinay Krishna Doddapaneni, Corvallis, OR (US); Yujuan He, Corvallis, OR (US); Jeffrey Dhas, Corvallis, OR (US); Brian K. Paul, Corvallis, OR (US); Somayeh Pasebani, Corvallis, OR (US); Chuankai Song, Corvallis, OR (US); Sakineh Abbasi, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 54 days.

(21) Appl. No.: 17/814,914

(22) Filed: Jul. 26, 2022

(65) Prior Publication Data
US 2023/0034642 A1    Feb. 2, 2023

Related U.S. Application Data

(60) Provisional application No. 63/226,700, filed on Jul. 28, 2021.

(51) Int. Cl.
*B05D 1/12* (2006.01)
*B05B 1/28* (2006.01)
(Continued)

(52) U.S. Cl.
CPC ............... *B05D 1/12* (2013.01); *B05B 1/28* (2013.01); *B05B 7/0075* (2013.01); *B29C 64/118* (2017.08)

(58) Field of Classification Search
None
See application file for complete search history.

(56) References Cited

U.S. PATENT DOCUMENTS 7,045,015 B2    5/2006    Renn et al.
7,507,380 B2    3/2009    Chang et al.
(Continued)

OTHER PUBLICATIONS

Govindarajan et al, "In situ Particle Generation and Splat Formation During Solution Precursor Plasma Spraying of Yttria-Stabilized Zirconia Coatings". 2011 J. Am. Ceram. Soc., 94: 4191-4199 (9 pages).

*Primary Examiner* — Jethro M. Pence
(74) *Attorney, Agent, or Firm* — MUGHAL GAUDRY & FRANKLIN PC

(57) ABSTRACT

A print head comprising nested chambers for in-situ reactant formation is disclosed. The print head comprises a first chamber nested within a second chamber. The first chamber comprises a first nozzle, the second chamber comprises a second nozzle. The first nozzle is substantially coaxial with the second nozzle. A susceptor to convert electromagnetic energy to heat is within the first chamber. The susceptor comprises one or more openings extending between the upper portion and the lower portion. The susceptor may be heated by induction heating or by optical heating to vaporize a precursor substance within the first chamber. The vapor may react with a reactive gas flowing through the first chamber or expand through a nozzle into a second chamber where the vapor may react with the reactive gas, forming nanoparticles. Patterned films may be written onto a two-dimensional or three-dimensional surfaces.

22 Claims, 14 Drawing Sheets

(51) Int. Cl.
    *B05B 7/00*          (2006.01)
    *B29C 64/118*      (2017.01)

(56) References Cited

U.S. PATENT DOCUMENTS

| | | |
|---|---|---|
| 7,846,489 B2 | 12/2010 | Chang |
| 7,938,341 B2 | 5/2011 | King et al. |
| 8,567,928 B2 * | 10/2013 | Kotabe .................. B41J 2/175 |
| | | 347/73 |
| 8,640,975 B2 | 2/2014 | King |
| 8,801,979 B2 | 8/2014 | Chang et al. |
| 8,887,658 B2 | 11/2014 | Essien et al. |
| 9,114,409 B2 | 8/2015 | King et al. |
| 9,270,864 B2 * | 2/2016 | Wada ................... H04N 1/6038 |
| 9,720,173 B2 * | 8/2017 | Coles ................... G02B 6/1225 |
| 2005/0156991 A1 | 7/2005 | Renn |
| 2017/0036396 A1 | 2/2017 | Paschkewitz et al. |
| 2017/0298516 A1 | 10/2017 | Gandhiraman et al. |
| 2019/0039299 A1 | 2/2019 | Busbee et al. |
| 2019/0143678 A1 | 5/2019 | Christenson et al. |
| 2022/0226888 A1 * | 7/2022 | Giacobbi ................ B22F 12/50 |
| 2022/0250377 A1 * | 8/2022 | Arima .................. B41J 2/16508 |
| 2023/0364913 A1 * | 11/2023 | Yamaguchi .......... B41J 2/16508 |
| 2023/0391089 A1 * | 12/2023 | Arima ................... B41J 2/1721 |
| 2023/0398777 A1 * | 12/2023 | Arima .................. B41J 2/16508 |

\* cited by examiner

PRINT HEAD FOR PRINTING NANOMATERIALS

CLAIM FOR PRIORITY

This application is a continuation of, and claims the benefit of priority to U.S. Provisional Patent Application No. 63/226,700, filed on Jul. 28, 2021, titled "PRINT HEAD FOR PRINTING NANOMATERIALS," and which is incorporated by reference in its entirety.

GOVERNMENT INTEREST RIGHTS

This invention was made with Government support under contract number PFI-RP 1941262 awarded by the National Science Foundation IIP, and contract number DE-EE0007888-10-4 awarded by the Department of Defense Advanced Manufacturing Office (AMO) and the Rapid Advancement in Process Intensification Deployment (RAPID) Institute. The Government has certain rights in this invention.

BACKGROUND

The ability to integrate multifunctional values into one material has crosscutting impacts in all aspects of our life. For example, one can engineer and modify structural materials that provide high mechanical strength at various length scales to attain additional functionality such as sensing, actuation, and energy transport. Such material is critical in smart systems in which material properties such as chemical, mechanical, optical, and electrical characteristics respond to external stimuli. The applications of these innovative multifunctional multiscale materials are expected to make significant impacts on economics via improved processes and products in many industry sectors such as chemical, construction, energy, semiconductor, aerospace, and defense, and create new avenues to enhance the quality of life via available and affordable energy, water, and food supplies, better-built environments, health care, and transportation, etc. As the demand for advanced materials with multifunctional properties grows, a new multiscale paradigm has revolutionized our ability to create novel materials. Additive manufacturing provides a route to realize this new paradigm. The multifunctionality of materials often occurs at multiscale on various length and temporal landscapes. The ability to print nanomaterials will further expand multifunctional, multi-material additive manufacturing.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1A:
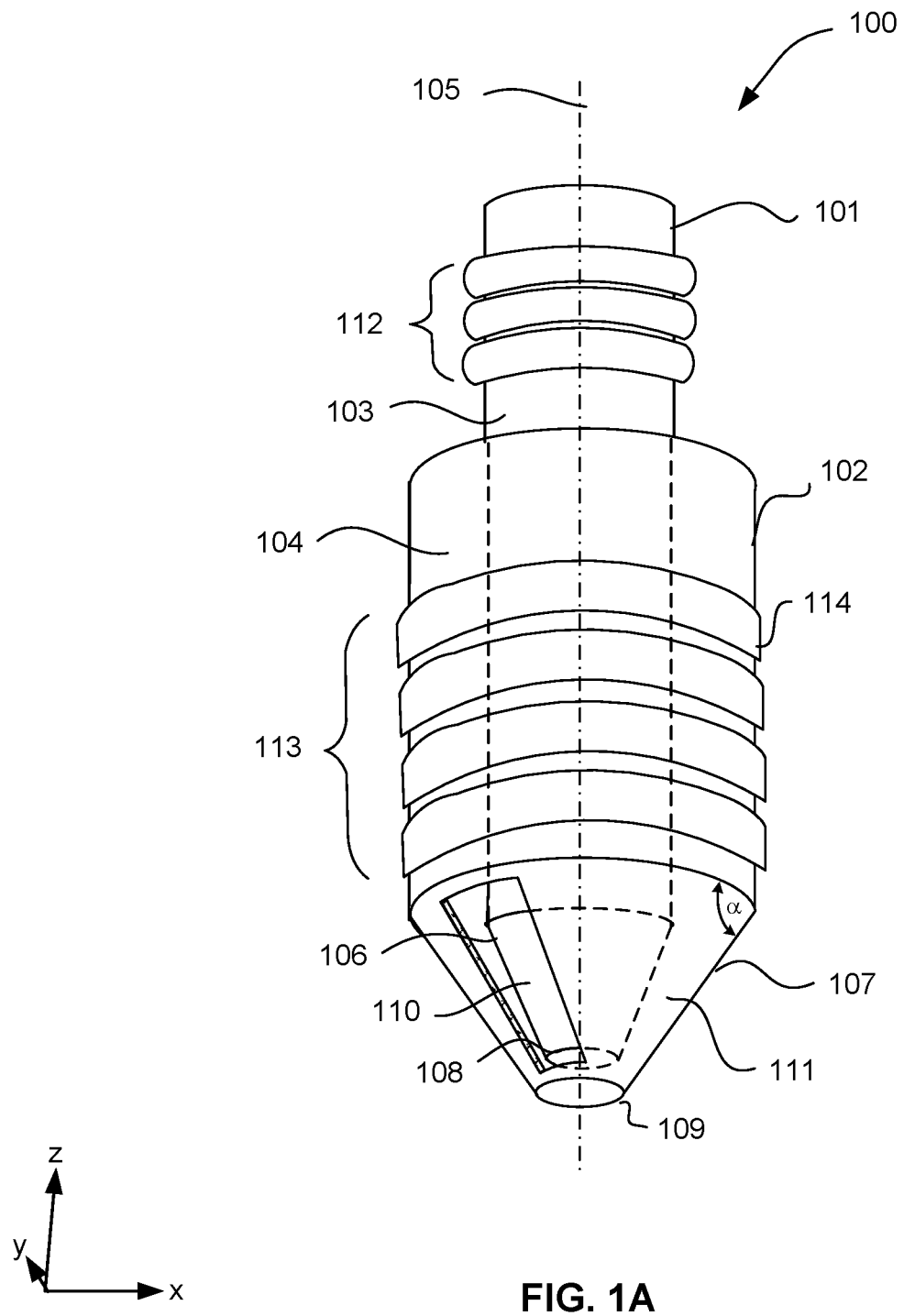
FIG. 1A illustrates a three-dimensional view of a print head comprising two nested chambers, according to some embodiments of the disclosure.

Disclosed herein is a print head comprising multiple nested chambers for deposition and printing of nanomaterials formed by in-situ chemical reactions. The in-situ chemical reactions may occur within at least one of the nested chambers of the multi-chamber print head. The disclosed print head enables a solvent-free, drop-on-demand 3D printing technology to deliver functional nanomaterials. In some embodiments, the print head comprises a first chamber nested within a second chamber. For example, the first chamber may be an innermost chamber of the print head. In other embodiments, the second chamber may also be nested within a third chamber. The third chamber may be an outermost chamber of the print head.

In some embodiments, each of the nested chambers (e.g., two or more nested chambers) of the disclosed print head has a substantially cylindrical sidewall (e.g., the chamber having a substantially circular or ovoid cross section). The sidewall may extend from a top edge to a base. In some embodiments, the cylindrical sidewall of each chamber may be coaxially arranged with respect to the chambers adjacent to it. Nested coaxial chambers may have successively increasing diameters (or widths), whereby the average diameters of the innermost and outermost chambers are the smallest and largest, respectively. In some embodiments, each of the multiple nested chambers may have a rectilinear (e.g., square) or polygonal cross section.

In some embodiments, the sidewall may be tapered along at least a portion of the sidewall extending between the top edge and the base. In some embodiments, the base may comprise a conical nozzle as described below, whereby the nozzle may have a deeper taper than the main portion of the chamber sidewall (e.g., the chamber sidewall is substantially straight and the nozzle sidewall diverges at an oblique angle from the straight chamber sidewall to form a conical tip. In some embodiments, the chamber and nozzle sidewalls may be uniformly tapered, whereby the chamber terminates at a conical tip that has substantially identical taper as the chamber sidewall. One or more nozzle orifices may be present on and/or near the tip of the base.

Nested chambers may comprise reaction and mixing chambers, whereby each chamber may be coupled to a liquid or gas flow source for introducing gaseous or liquid reactant materials and/or inert or reactive carrier gas materials into reaction and mixing chambers. In some embodiments, the nozzles of adjacent nested chambers may be aligned to enable sheath flow of an inert or reactive gas to flow over a reactive jet emanating from an inner chamber, whereby the gas flow forms an isolating curtain or sheath of gas around the reactive jet. The sheath flow may prevent contact of a reactive jet with chamber sidewalls, for example, to prevent fouling of the interior of the outermost chamber and possible blockage of the nozzle orifice.

In some embodiments, a susceptor may be integral with walls of the innermost chamber. In other embodiments, the susceptor may be part of an external precursor reservoir, where the external precursor reservoir is physically separate from the print head. The susceptor is a metallic or dielectric structure that may efficiently convert electromagnetic radiation to heat. During operation of the disclosed print head, the susceptor may be heated indirectly by inductive heating or by optical heating. For example, the susceptor may be a porous metal plate or metallic beads that inductively couple radio frequency (RF) radiation from an induction coil, converting such radiation into heat.

In another example, the susceptor may efficiently absorb optical radiation in the infrared portion of the optical spectrum. The optical radiation may be supplied by an infrared laser, for example. In some embodiments, the susceptor may also be operable to convert visible radiation to heat. An optical window that is substantially transparent to the infrared portion or visible to the electromagnetic spectrum may be included, for example, in a wall of the disclosed print head. The heat generated by the susceptor may be channeled to an adjacent nongaseous (e.g., liquid or solid) precursor substance (hereinafter, precursor substance), enabling vaporization of the precursor substance.

In some embodiments, the disclosed print head may be operable to accept a precursor substance within the innermost chamber. For example, in some embodiments, the innermost chamber comprises an upper portion, above the susceptor, which is operable to contain a nongaseous precursor substance.

For example, the precursor substance may generally be a solid material heated by the adjacent susceptor. A solid precursor may be heated to an elevated temperature and sublimate into vapor in-situ within the innermost chamber. In other examples, the precursor substance may be a liquid material. A liquid precursor may be heated to its boiling point by heat transfer from the adjacent susceptor, enabling a phase transition from liquid to vapor state in-situ. In some embodiments, the vaporization of the precursor may be carried out in-situ within the innermost chamber of the print head, enabling passage of a carrier gas to mix with the vapor.

The porosity of the susceptor may enable precursor vapor to be swept by the carrier gas entering the innermost chamber and into the second or third chamber through the susceptor. Further, mixing with a second gas may occur within the second or third chamber. The second gas may be an inert gas, such as argon, or a reactive gas, such as oxygen, water vapor, or hydrogen. The second gas may be flowed into the second chamber to mix or react with precursor vapor. In some implementations, the precursor may homogeneously react with the second gas to form nascent nanoparticles within the outermost chamber of the disclosed print head. In some embodiments, the outermost chamber is the second chamber. In some embodiments, the disclosed print head may comprise a third chamber in which the first and second chambers are nested. The third chamber may be the outermost chamber.

Gases flowing from the innermost chamber to the outermost chamber may pass through an inner nozzle extending below the innermost chamber. In some embodiments, the second chamber is the outermost chamber. An outer nozzle may extend below the outermost chamber. The inner nozzle and outer nozzle may be operable to enable expansion of issuing gases into substantially laminar jets. For example, an inner jet may issue from the inner nozzle. An outer jet may issue from the outer nozzle. In implementations where nanoparticles are generated homogeneously in-situ within the second chamber, the outer nozzle may enable formation of an outer jet comprising a sheath flow comprising the second gas around an inner jet containing the nanoparticles. In some embodiments, a third gas may be introduced into a third chamber. The third gas may form a sheath flow around an inner jet comprising nascent nanoparticles or unreacted vapor.

The first chamber comprises a first nozzle that opens into the second chamber. The second chamber comprises a second nozzle that may open to the exterior atmosphere, or in multiple-chamber embodiments, the second nozzle opens into a third chamber. The outermost chamber comprises an exterior nozzle at the bottom of the outermost chamber. For example, a print head comprising two chambers has an exterior nozzle at the bottom of the second chamber, whereby the second chamber is the outermost chamber. In a multiple chamber print head, the individual chambers comprise a nozzle at a lower end.

In some implementations, the disclosed print head may be operable to directly print nanostructured films on a target surface. A method for direct printing of nanoparticle films on a target surface may describe issuing a reactive jet from the outer nozzle of the disclosed print head. The reactive jet may comprise one or more reactive gases that react in-situ (e.g., in gas phase within the jet) with the precursor substance vapor to form nanoparticulate solids. Nascent nanoparticles may form homogeneous reaction products. For example, the reactive jet may contain oxygen that reacts with a readily oxidizable precursor to form metal oxide nanoparticles. The nascent nanoparticles may nucleate within and/or outside of the outermost chamber and grow during jet flow from the print head to a target surface. As an example, the outer nozzle of the print head may be positioned over a two-dimensional or three-dimensional surface onto which the jet impinges, enabling deposition of nanoparticulate materials onto the surface.

Nascent nanoparticles formed homogeneously within the disclosed print head may be deposited onto the target surface by directing the second jet issuing from the disclosed print head onto the target surface. By direct writing methods, the deposited nanoparticles may be formed into patterns of compact nanostructured films on the target surface.

In some implementations, precursor vapor may not undergo reaction to form nanoparticles in-situ within the disclosed print head, but may instead issue from the outer nozzle as a mixture of unreacted vapor and carrier gas. In some embodiments, the reactive jet may comprise a single reactant or multiple reactants as vapors of solid or liquid reactants, or reactive gases that is/are carried by a carrier gas to a heated and/or catalytic surface, where the reactant(s) undergo reactions to form surface-bound nanoparticles or solid films.

In some embodiments, the print head may be operable to print films of unreacted precursor substance directly on a target surface. The precursor substance may undergo a subsequent heterogeneous reaction on the target surface. In some embodiments, the surface reactions may be assisted by laser-induced photothermal reactions. In other embodiments, the surface reactions may be induced by heating the target surface.

It will be understood that gas-phase nanoparticle formation is merely one example of suitable reaction classes that may be carried out within the disclosed print head. Other reaction types, such as formation of gas-phase products that may further react on a target surface, may be included within the scope of the disclosure.

In this disclosure, it is understood that the terms "over," "under," "above," "below," "upper," "lower," "top," and "bottom" have the usual structural meanings, referring to relative vertical positions within structural embodiments and to their immediate environment as viewed within the associated figures. Similarly, the terms "left," "right," "side," and "sideways" have the usual structural meanings, referring to relative horizontal positions within structural embodiments and within their immediate environment as viewed within the associated figures.

The terms "substantial" or "substantially" are used within this disclosure to mean "the greater part of," "mostly," or "mostly to fully." For example, "substantially" may qualitatively indicate a measure within 10% of a quantifiable attribute, with the possibility that the measure may range from 90% to 100% of the quantifiable attribute.

Views labeled "cross-sectional," "profile," "plan," and "isometric" correspond to orthogonal planes within a cartesian coordinate system. Thus, cross-sectional and profile views are taken in the x-z plane, plan views are taken in the x-y plane, and isometric views are taken in a 3-dimensional cartesian coordinate system (x-y-z). Where appropriate, drawings are labeled with axes to indicate the orientation of the figure.

FIG. 1A illustrates a three-dimensional view of print head 100 comprising two nested chambers, according to some embodiments of the disclosure.

Print head 100 comprises inner chamber 101 nested within outer chamber 102. In the illustrated embodiment, inner chamber 101 and outer chamber 102 comprise concentric cylindrical sidewalls 103 and 104, respectively. Inner chamber 101 may be partially within outer chamber 102, and may extend though the length of outer chamber 102 as indicated by the hidden lines. While sidewalls 103 and 104 of inner chamber 101 and outer chamber 102 are shown to be cylindrical about a center axis 105 in the illustrated embodiment, sidewalls 103 and 104 may have other suitable shapes, for example, shapes having rectilinear or polygonal cross sections. In some embodiments, one or both of sidewalls 103 and 104 may be at least partially tapered to form inner nozzle 106 and outer nozzle 107, respectively. The cross sections of inner nozzle 106 and outer nozzle 107 may be conical along the central axis 105 of print head 100 (central axis 105 may be parallel to the z-axis of the figure, as shown). Central axis 105 may be common to chambers 101 and 102, whereby chambers 101 and 102 are coaxial. In further embodiments described below, multiple nested chambers are coaxial (e.g., concentric), having a common central axis like central axis 105.

The cutaway window in outer nozzle 107 is illustrated to permit the viewing of inner nozzle 106 through outer nozzle 107. In the illustrated embodiment, inner and outer nozzles 106 and 107 have a conical geometry as shown. In some embodiments, inner and outer nozzles 106 and 107 may have other tapered geometries. The taper angle α of nozzles 106 and 107 may be adjusted to suit desired flow characteristics of reactant and sheath gases. Nozzles 106 and 107 may each comprise at least one orifice, for example, inner orifice 108 and outer orifice 109, respectively. Inner orifice 108 and outer orifice 109 may be disposed at the apices of inner and outer nozzles 106 and 107, respectively. In the illustrated embodiment, inner orifice 108 and outer orifice 109 are concentrically aligned to enable sheath flow as described above. While not shown, in some embodiments, inner and outer nozzles 106 and 107 may comprise multiple orifices disposed on nozzle sidewalls 110 and 111, respectively.

In the illustrated embodiment, chamber 101 comprises induction coil 112 disposed along a portion of sidewall 103 of inner chamber 101. In some embodiments, induction coil 112 may be adjacent to a susceptor structure (described below) disposed within the interior of inner chamber 101. Sidewall 103 may physically separate induction coil 112 from an interior susceptor structure.

Sidewall 103 may comprise a material that is compatible with the intended irradiation method to heat the susceptor structure. For example, for inductive heating, sidewall 103 may comprise a suitable non-metallic material, such as, but not limited to, float glass, borosilicate glass, silica, a ceramic, or a polymer. In some embodiments, a non-magnetizable (e.g., non-ferrous, para- and diamagnetic) metal, such as aluminum, copper, or stainless steel may be employed. The material may be chosen so that the susceptor may not be shielded from the high-frequency magnetic field emanating from induction coil 112 comprising an inductive heating electromagnetic coil. Induction coil 112 may be electrically insulated from an electrically conductive sidewall 103 by inclusion of a dielectric layer between induction coil 112 and sidewall 103 (not shown).

While not shown in FIG. 1A, in some embodiments, chamber 101 may comprise an optical window that is at least partially transparent to infrared (IR) or visible light transmitted optically (e.g., by optical fiber coupled to an infrared (IR) or visible laser). Sidewall 103 may entirely or partially comprise the optical window material, as described below.

In some embodiments, chamber 102 comprises heater 113 on outer surface of sidewall 104. Heater 113 may comprise resistive heating elements 114 to heat sidewall 104. As an example, resistive heating elements 114 may comprise flexible resistive strips that may be wrapped around sidewall 104. In some embodiments, heater 113 is optional. Heater 113 may provide sufficient heat to sidewall 104 to provide convective and radiative heat to the interior of chamber 102 to enable gas phase reactions within chamber 102. Alternatively, sidewall 104 may be heated to a sufficiently high temperature to prevent nucleation and/or growth of nanoparticles and larger crystals on the interior surfaces of sidewall 104 and nozzle 107.

Figure 1B:
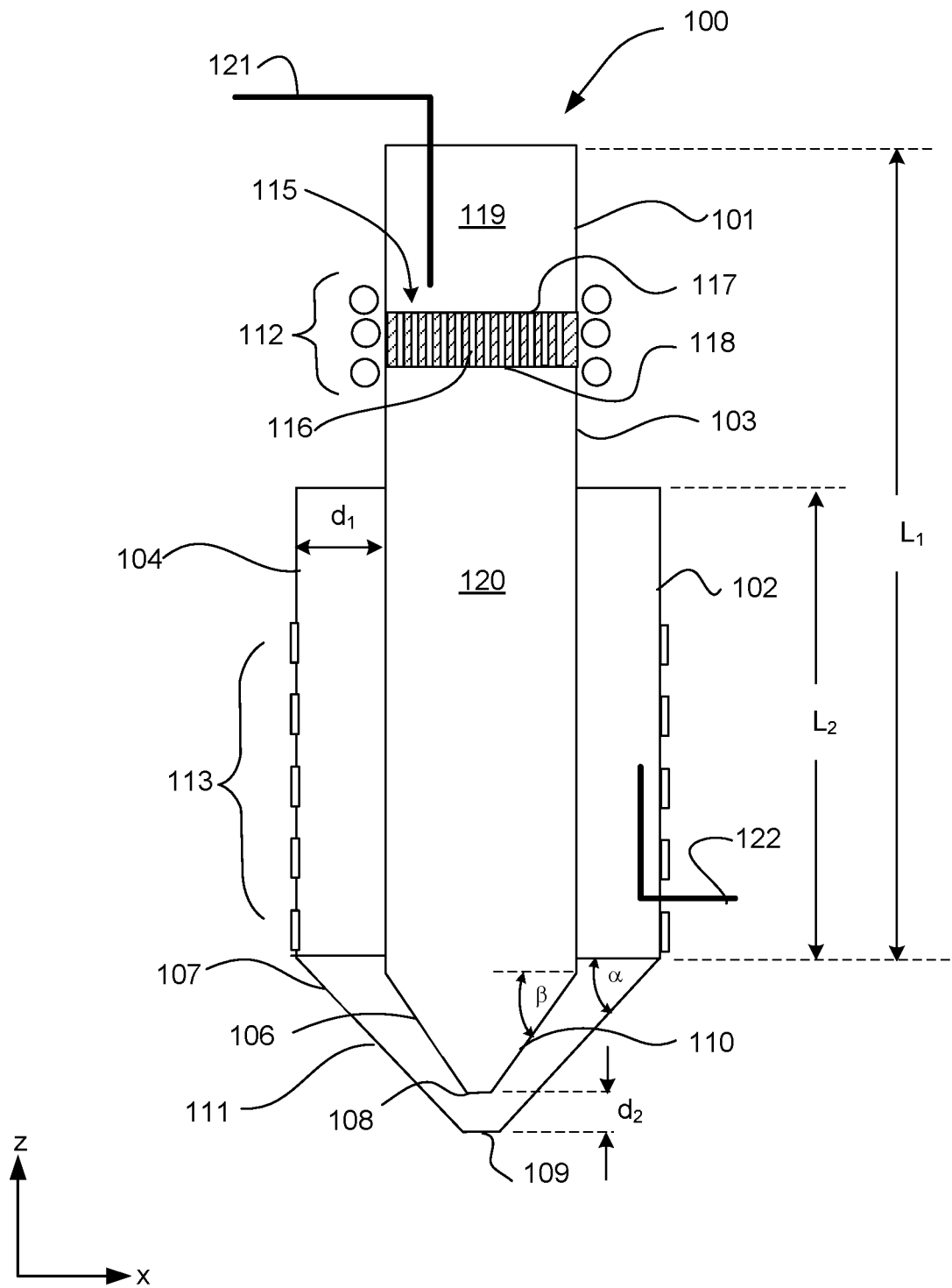
FIG. 1B illustrates a cross-sectional view in the x-z plane of print head, according to some embodiments of the disclosure.

FIG. 1B illustrates a cross-sectional view in the x-z plane of print head 100, according to some embodiments of the disclosure.

Susceptor 115 is within chamber 101 above chamber 102. Susceptor 115 comprises a porous plate, comprising openings 116 extending from upper surface 117 to lower surface 118. In some embodiments, openings 116 are pores that may follow tortuous paths between upper surface 117 and lower surface 118. Susceptor 115 may comprise a material that rapidly heats when irradiated with electromagnetic energy as described above. For example, susceptor 115 may comprise a ferrous or non-ferrous metal in which electrical currents circulate when inductively heated by induction coil 112.

In alternative embodiments, susceptor 115 may rapidly heat when irradiated by strong absorption of IR or visible light. For example, susceptor 115 may comprise refractory non-metallic materials such as, but not limited to, black titania, silicon carbide, or silicon nitride, or any combination of the foregoing materials. In some embodiments, metallic materials such as titanium, tungsten, copper, and some steels may also be employed.

As shown in the illustrated embodiment, susceptor 115 may physically separate chamber 101 into upper portion 119 and lower portion 120. Upper portion 119 and lower portion 120 may be in fluidic communication with one another through openings 116 within susceptor 115. As shown in the illustrated embodiment, upper portion 119 and lower portion 120 may have a combined length $L_1$ that may be adjusted for specific residence times that may be partially determined by flow rates of a carrier gas flowing through inner chamber 101. Lower portion 120 may extend into second chamber 102 for at least length L2 of chamber 102. Length $L_2$ may be adjusted to enable development of laminar sheath flow of a carrier gas (e.g., argon), for example. Sidewall 104 of chamber 102 may be separated from sidewall 103 of chamber 101 by a distance $d_1$. The distance $d_1$ may be adjusted to accommodate a desired chamber volume, for example.

Inner and outer orifices 108 and 109 may be aligned concentrically as shown, and vertically separated by distance $d_2$. Distance $d_2$ may be adjusted to enable development of sheath flow over the nanoparticle jet exiting through inner orifice 108, for example. In some embodiments, nozzle sidewalls 110 and 111 may deviate from chamber sidewalls 103 and 104 by conical angles α and β, respectively. In some embodiments, angles α and β may be substantially equal. Angles α and β may be adjusted to achieve desired flow characteristics within chambers 101 and 102.

In some embodiments, temperatures sensing element 121 may be included within upper portion 119 of chamber 101. Temperature sensing element 121 may be a thermocouple or a resistive temperature detector (RTD). Temperature sensing element 121 may be in proximity of susceptor 115, or immersed within a nongaseous precursor substance mass adjacent to susceptor 115. Temperature sensing element 121 may be electrically coupled to a driver to power induction coil 112. Power fed to induction coil 112 may be controlled to control the inductive heating of susceptor 115. In some embodiments, a second temperature sensing element 122 may be optionally included within outer chamber 102 for similar temperature control of heater 113.

Figure 2A:
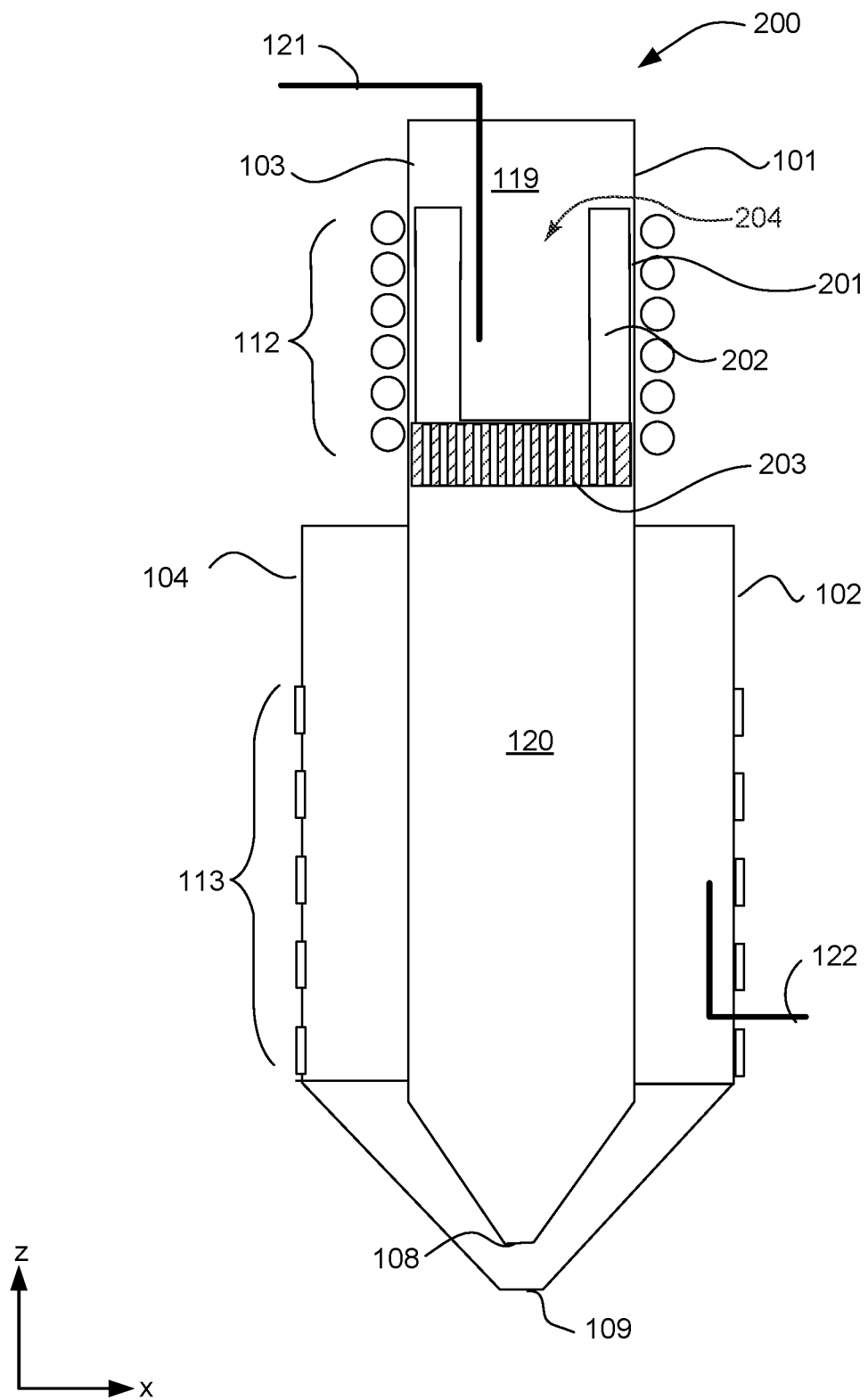
FIG. 2A illustrates a cross-sectional view in the x-z plane of a print head comprising an inductively heated packed bed susceptor cartridge, according to some embodiments of the disclosure.

FIG. 2A illustrates a cross-sectional view in the x-z plane of print head 200 comprising an inductively-heated packed bed susceptor cartridge, according to some embodiments of the disclosure.

Print head 200 is substantially identical to print head 100 as described above. Susceptor 201 comprises a basket cartridge for containing a packed bed (see FIG. 3A). Susceptor 201 comprises sidewall 202 and porous plate 203. Sidewall 202 and porous plate 203 may be integral in a single structure. Porous plate 203 may be similar to plate susceptor 115 shown in FIG. 1B. While porous plate 203 is shown to have straight openings, other pore structures may be possible. For example, porous plate 203 may comprise a sintered material that has a void volume comprising an internally interconnected pore structure.

As shown in FIG. 1B, susceptor 201 is disposed within chamber 101 adjacent to induction coil 112. In some embodiments, susceptor 201 may comprise a material that may be optically heated by IR or visible laser irradiation. The thimble or basket-like shape of susceptor 201 may enhance heating of a precursor substance held within cavity 204 of susceptor 201. Sidewall 202 of susceptor 201 may transfer heat more efficiently than porous plate 203 alone.

Figure 2B:
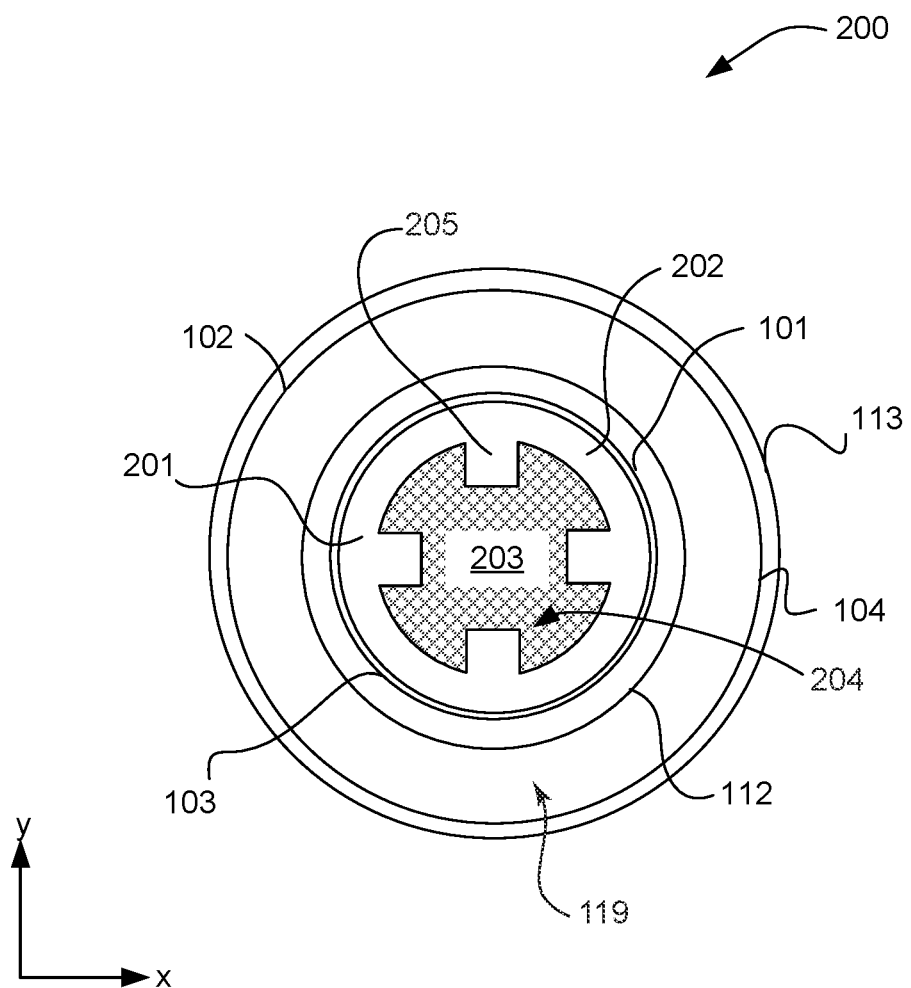
FIG. 2B illustrates a plan view in the x-y plane of a print head, according to some embodiments of the disclosure.

FIG. 2B illustrates a plan view in the x-y plane of print head 200, according to some embodiments of the disclosure.

The plan view of FIG. 2B looks down into the open top of upper portion 119 of chamber 101 from a vantage point over (on the z-axis) print head 200. Susceptor 201 comprises fins 205 extending from sidewall 202 over portions of porous plate 203. As fins 205 extend into the interior of susceptor 201, fins 205 may aid in spreading heat to material contained within the basket structure of susceptor 201.

Induction coil 112 is shown surrounding sidewall 103 of chamber 101. In the illustrated embodiment, induction coil 112 is wound around the cylindrical body of chamber 101. In some embodiments, heater 113 may comprise resistive heating wires (e.g., nichrome wire). While electric heater 113 is shown to be wrapped completely around sidewall 104 of chamber 102 below chamber 101, heater 113 may comprise partially wrapped heating structures, such as wires or pads, partially or fully extending around sidewall 104.

Figure 2C:
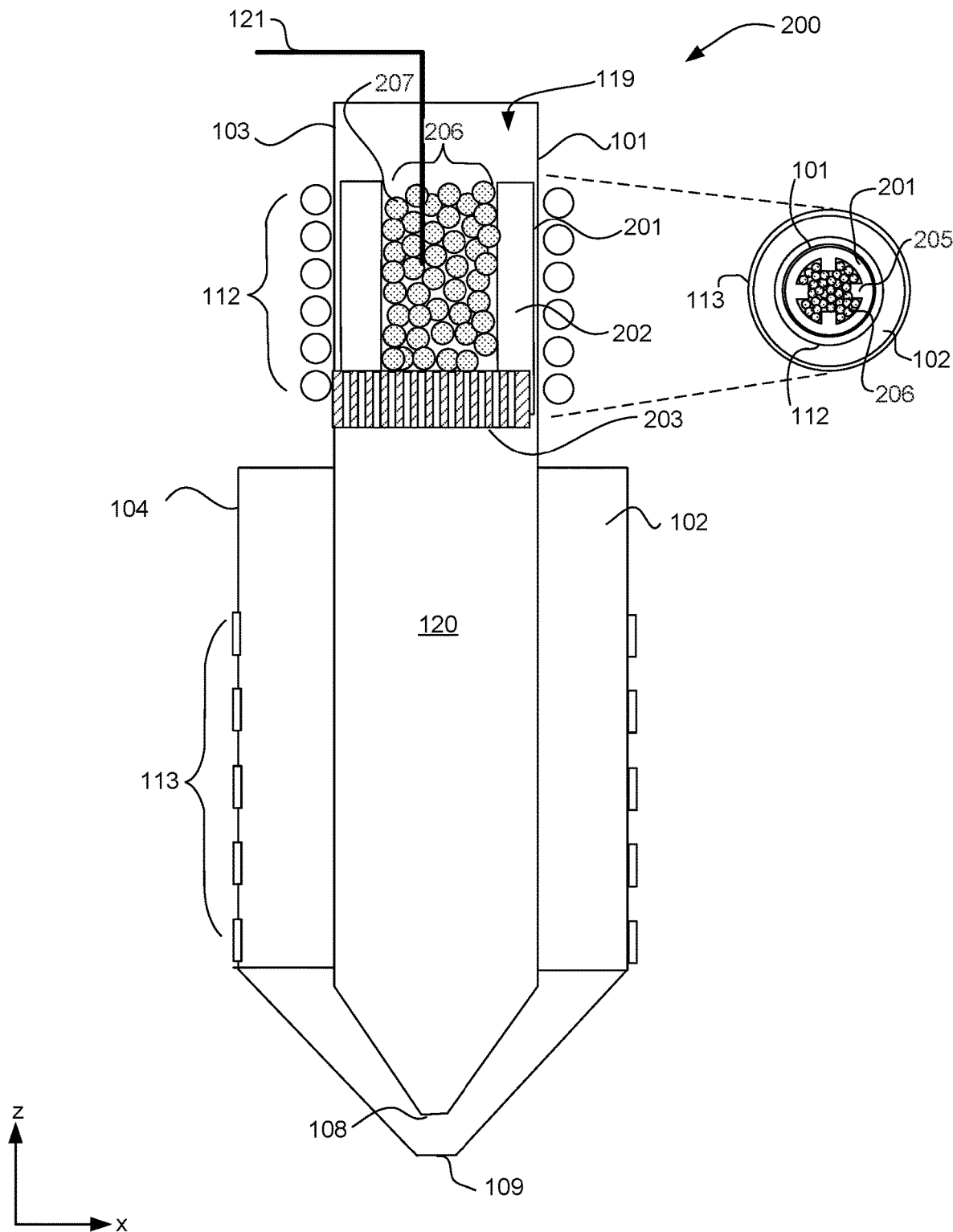
FIG. 2C illustrates a cross-sectional view in the x-z plane of a print head comprising a packed bed susceptor, according to some embodiments of the disclosure.

FIG. 2C illustrates a cross-sectional view in the x-z plane of print head 200, comprising a packed bed susceptor, according to some embodiments of the disclosure.

In print head 200, susceptor 201 comprises packed bed 206. Packed bed 206 comprises particles 207. Particles 207 may comprise a dielectric or metallic material that may be heated inductively or by optical irradiation as described above. Particles 207 may range in size from between 10 microns to 2 mm. Packed bed 206 may be particularly advantageous for rapid heating of liquid and gas primary reactants that flow through pores between particles 207. In some embodiments, a top grill or lid over the top of packed bed 206 (not shown) may be included to contain packed bed 206 within the basket structure of susceptor 201.

The inset of FIG. 2C shows a plan view of print head 200 looking down into the open top of inner chamber 101. Susceptor 201 may comprise fins 205 that extend into packed bed 206 for enhanced head transfer.

Figure 2D:
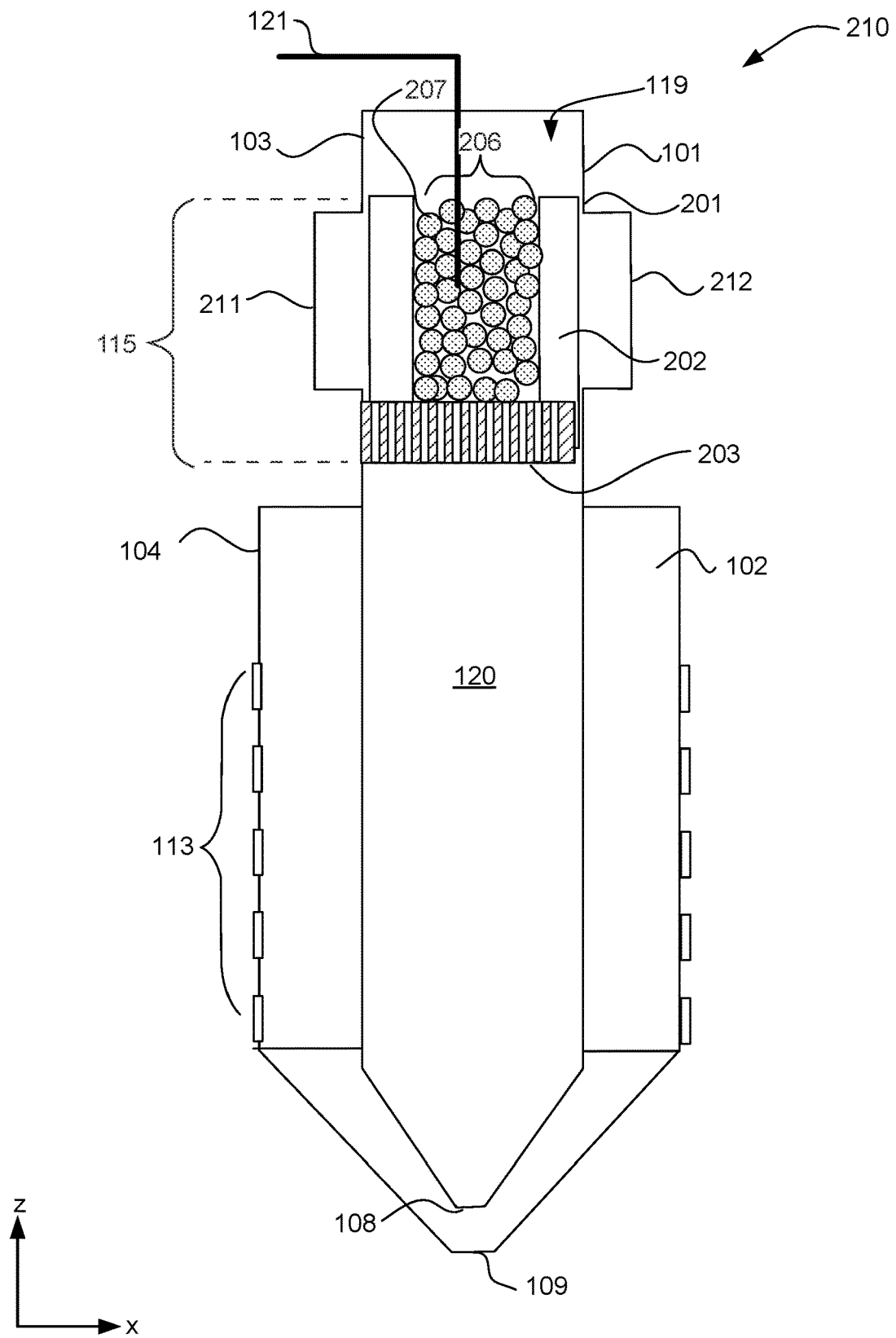
FIG. 2D illustrates a cross-sectional view in the x-z plane of print head comprising optical windows for optical heating of the susceptor structure, according to some embodiments of the disclosure.

FIG. 2D illustrates a cross-sectional view in the x-z plane of print head 210 comprising optical windows for optical heating of the susceptor structure, according to some embodiments of the disclosure.

Optical windows 211 and 212 may be included within upper portion 119 of inner chamber 101. Optical windows 211 and 212 may comprise a material that is at least partially transparent to infrared light. An exemplary material may be silicon or silicon oxide (e.g., glass or fused silica). Light from an IR laser may be coupled into inner chamber 101 through optical windows 211 and/or 212 by an optical fiber coupling (not shown).

Correspondingly, susceptor 115 may comprise an optically absorptive material capable of absorbing the optical energy. For example, susceptor 115 may comprise black titania that absorbs deep into the infrared spectrum and across the visible spectrum.

Figure 3A:
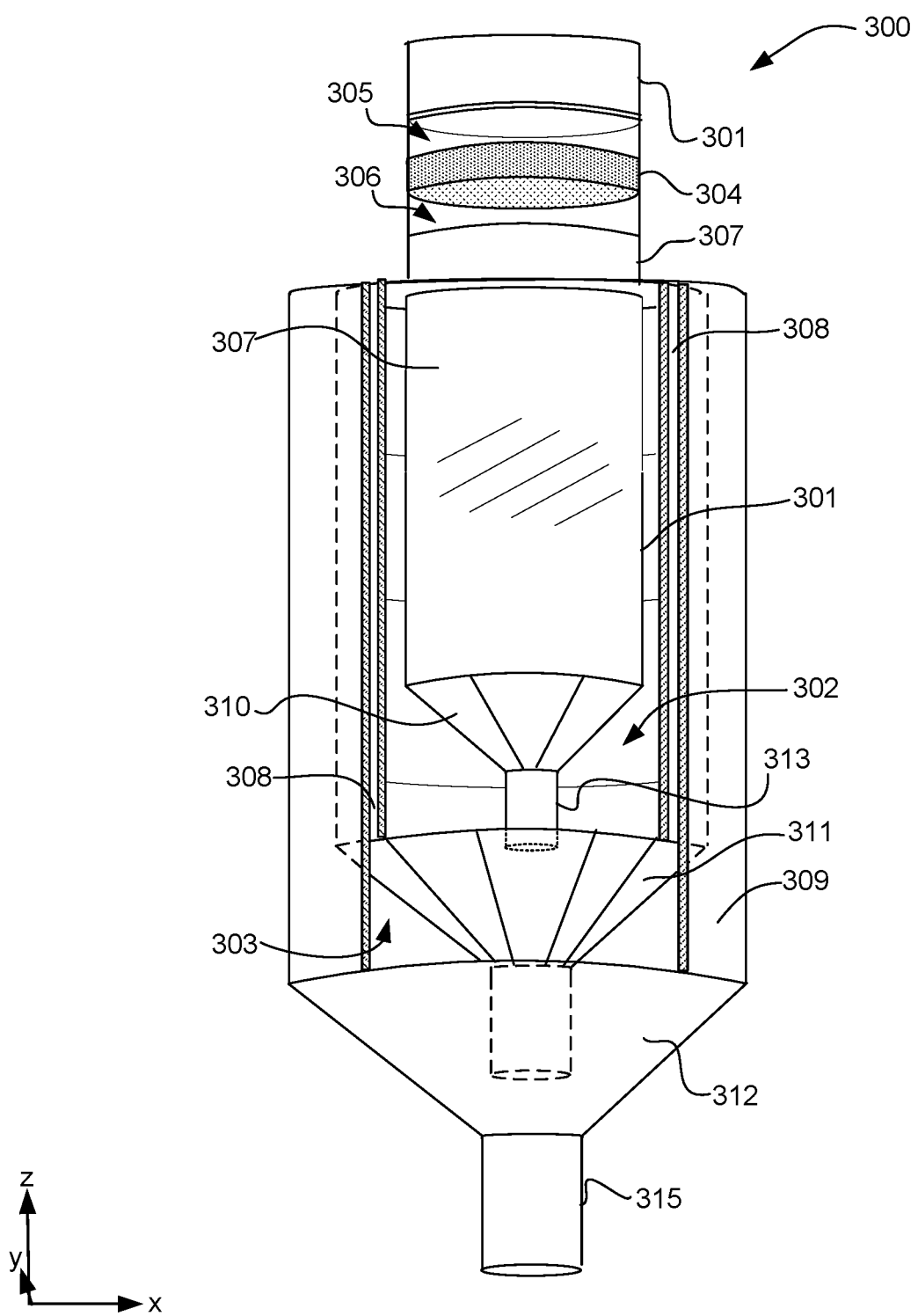
FIG. 3A illustrates a three-dimensional view of a print head comprising three nested chambers, according to some embodiments of the disclosure.

FIG. 3A illustrates a three-dimensional view of print head 300, comprising three nested chambers, according to some embodiments of the disclosure.

Interior chambers and structures of print head 300 are shown through cut-away views. Heating structures that may be included in print head 300 are not shown in FIG. 3A but shown in cross-sectional view in FIG. 3B. Print head 300 comprises innermost chamber 301, second chamber 302 (arrow pointing to interior of chamber 302), and outermost chamber 303 (arrow pointing to the interior of chamber 303). Susceptor 304 may comprise a porous plate structure separating chamber 301 into upper portion 305 and lower portion 306. Upper portion 305 and lower portion 306 may be in fluidic communication through pores or openings (not shown) within susceptor 304. While in the illustrated embodiment susceptor 304 is shown as a flat porous plate, other geometries, such as basket geometry (e.g., susceptor 201 shown in FIGS. 2A-2C) may be employed. Chamber 301 may comprise sidewall 307 that extends at least partially into chamber 302. Chamber 302 may comprise sidewall 308 that is at least partially encased within sidewall 309 of chamber 303.

Figure 3B:
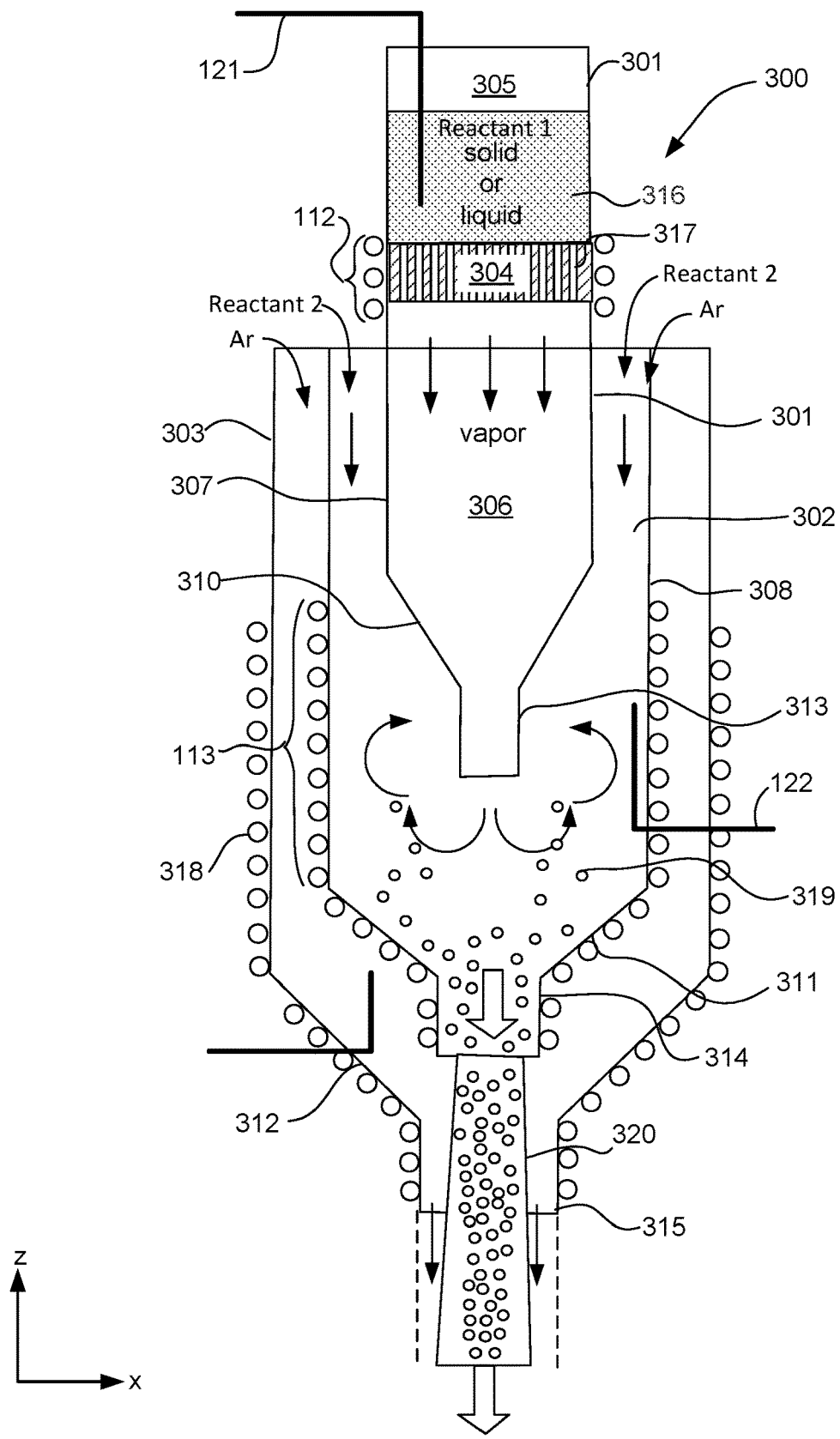
FIG. 3B illustrates a cross-sectional view of a print head showing an exemplary implementation for nanoparticle formation and deposition, according to some embodiments of the disclosure.

Chambers 301, 302 and 303 may provide functions as those described above. Chambers 301-303 may comprise conical nozzles 310, 311, and 312, respectively. Nozzles 310-312 may be terminated by cylindrical noses (e.g., noses 313 and 315; nose 314 extending from nozzle 311 is shown in FIG. 3B) that may enable certain flow characteristics of sheath flow or reactant flow. Outermost chamber 303 may be coupled to a carrier gas or reactive gas source (not shown). Innermost chamber 301 may be employed to vaporize a precursor substance and mix with a secondary reactant (in gas phase) introduced into second chamber 302 by expansion through nozzle 310. The reaction products, such as nascent nanoparticles, may be entrained within carrier gases (e.g., both inert and reactive) that flow out of nozzle 311 into outermost chamber 303.

FIG. 3B illustrates a cross-sectional view of print head 300, showing an exemplary implementation for nanoparticle formation and deposition, according to some embodiments of the disclosure.

Chamber 301 may be an innermost chamber. Chamber 301 may contain precursor substance 316 within upper portion 305. Precursor substance 316 may be adjacent and in direct contact to susceptor 304. As noted above, precursor substance 316 may be a nongaseous (e.g., liquid or solid) material that is added to print head 300 manually or by automated methods. Temperature sensing element 121, described above, may be adjacent to or submerged within precursor substance 316. Temperature sensing element 121 may be operable to monitor the temperature of precursor substance 316. Susceptor 304 may comprise openings 317. As noted above, susceptor 304 may be heated by induction coil 112. Heat may be transferred from susceptor 304 to precursor substance 316, causing vaporization or sublimation of precursor substance 316. Vapors of precursor substance 316 may expand through openings 317 into lower portion 306 of chamber 301.

Movement of vapor through lower portion 306 may be assisted by inert gases introduced into upper portion 305. Precursor vapor may expand through nose 313 of nozzle 310. A secondary reactant (reactant 2) may be introduced into second chamber 302 as a gas or vapor, and flow along sidewall 307 of chamber 301 and nozzle 310. As noted above, the length and diameter of chamber 301 may be adjusted to develop desired flow characteristics, such as laminar sheath flow. In some instances, turbulent flow may be desired for mixing precursor vapor and the secondary reactant in the gas phase. Curved arrows drawn within secondary chamber 302 indicate mixing by turbulence.

The temperature of gases and gaseous reactants within chamber 302 may be monitored by means of temperature sensing element 122 (e.g., a thermocouple). A temperature controller (not shown) may be electronically coupled to temperature sensing element 122 and adjust power output to heater 113, accordingly. Further, heat control of heater 318 around outermost chamber 303 may comprise a resistive heating coil (e.g., nichrome).

In the illustrated example, nascent nanoparticles 319 may begin to form within second chamber 302. Heater 113 may heat sidewall 308 of second chamber 302 to a desired temperature, for example, to prevent deposition of nanoparticles on the interior surface of sidewall 308 (and nozzle 311). A stream comprising unreacted gas phase reactants and incipient nanoparticles may emerge through nozzle 311 and nozzle nose 314 into chamber 303, the outermost chamber. An inert gas (e.g., argon) may be introduced into chamber 303, and develop desired flow characteristics, such as laminar flow, for example, to create a sheath flow over emerging nanoparticle jet 320 through nose 315.

As an example, yttrium oxide (e.g., yttria) nanoparticles may be formed by the reaction of yttrium (III) tris(2,2,6,6-tetramethyl-3,5-heptanedionate) (Y(tmhd)$_3$) with oxygen. Yttrium oxide (yttria) is a material used for manufacture of yttrium aluminum garnet (YAG) materials used in lasers and optoelectronic components. Y(tmhd)$_3$ has a sublimation temperature of 90° C., and may be decomposed in the presence of oxygen at temperatures above 394° C. As an initial step, oxygen may be flowed over a mass of the precursor within innermost chamber 301. The material may sublimate and create precursor vapors after heating by susceptor 304. Temperatures of at least 90° C. may be reached by susceptor 304, causing a vapor to be formed comprising yttrium (III) tris(2,2,6,6-tetramethyl-3,5-heptanedionate) (Y(tmhd)$_3$)

The vapor of Y(tmhd)$_3$ may be entrained within a flow of oxygen that expands into second chamber 302, which may be heated to decomposition temperatures by heater 113. In-situ formation of nascent nanoparticles of yttria (Y$_2$O$_3$) nanoparticles may ensue within the gas phase along with the by-product gases. The compositional balance may be adjusted by controlling temperature and residence time (e.g., flow rate) within second chamber 302. The stream of nanoparticles may expand into outermost chamber 303 as a jet. An inert carrier gas, such as argon, may flow into outermost chamber 303 and develop laminar flow characteristics. A sheath flow may develop by the inert gas, enveloping the nanoparticle jet. The sheath flow may focus the nanoparticle jet into a narrow stream of controllable diameter for precision deposition of the yttria nanoparticles in written patterns on two-dimensional and three-dimensional surfaces. The sheath gas may serve to exclude air from the deposition site and/or to prevent fouling of print head chamber surfaces.

In another example, tungsten (W) nanoparticles or nanostructured materials may be formed by the decomposition of tungsten hexacarbonyl in the inert atmosphere. Tungsten is a refractory metal that has wide variety of applications. Tungsten hexacarbonyl may be employed as a precursor for formation of nanoparticles comprising tungsten oxide or metallic tungsten. Tungsten hexacarbonyl has a vapor pressure of 2 mmHg at 65° C. Heating tungsten hexacarbonyl to 65° C. or above will cause it to sublimate, developing precursor vapor. Tungsten hexacarbonyl vapor may be carried into the reaction zone in chamber 302. Depending on the carrier gas flowing within chamber 302, tungsten hexacarbonyl may decompose homogeneously into tungsten metal or tungsten oxide ($WO_3$) nanoparticles in the gas phase and carbon monoxide (CO) at temperatures above 175° C. Similar refractory metal carbonyls, such as titanium hexacarbonyl and molybdenum hexacarbonyl, may be similarly employed as precursor substances to form titanium or molybdenum nanoparticles. Other organometallic compounds, such as zirconium tert-butoxide, as described below, may also be suitable precursor substances.

Figure 4:
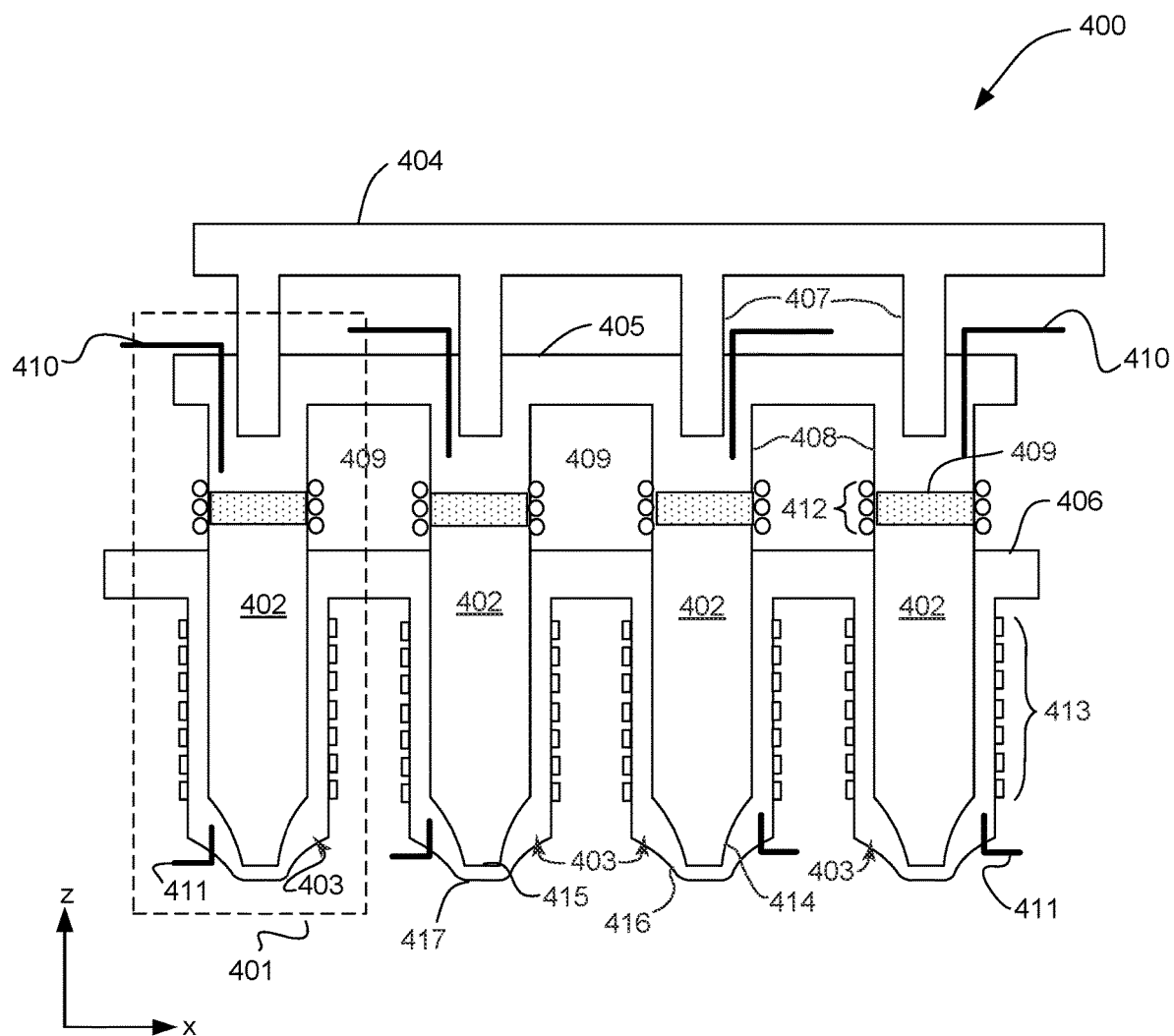
FIG. 4 illustrates a cross-sectional view in the x-z plane of a print head array comprising multiple nested-chamber print heads and a manifold system, according to some embodiments of the disclosure.

FIG. 4 illustrates a cross-sectional view in the x-z plane of a print head array 400, comprising multiple nested-chamber print heads and a manifold system, according to some embodiments of the disclosure.

Print head array 400 comprises multiple individual print heads 401 that may be arranged in a linear one or two-dimensional array. Individual print heads 401 comprise inner chamber 402 and outer chamber 403. Print head array 400 may also comprise distribution manifolds 404, 405, and 406. Individual distribution manifolds 404, 405, and 406 may be fluidically coupled to inner chamber 402 and outer chamber 403. For example, distribution manifold 404 may comprise outlets 407 that open into upper portions 408 of inner chambers 402. In some implementations, distribution manifold 404 may deposit liquid precursor substance into upper portions 408, above susceptors 409.

In some embodiments, distribution manifold 405 may be in fluidic communication with inner chambers 402. Distribution manifold 405 may distribute carrier gas to inner chambers 402, for example. Similarly, distribution manifold 406 may be fluidically coupled to outer chambers 403. Distribution manifold 406 may distribute a second gas to outer chambers 403, for example. In some implementations, distribution manifolds 404-406 may be coupled to gas and reactive material sources that may be metered by valves and pumps.

As shown in the illustrated embodiment, temperature sensing elements 410 and 411 may be optionally inserted within interiors of inner chamber 402 and outer chamber 403, respectively. Temperature sensing elements 410 and 411 may be thermocouples or resistance temperature devices (RTDs), for example, and may be optionally included for monitoring and controlling print head temperatures. In some implementations, temperature sensing elements 410 and 411 may be employed in a temperature control feedback circuit that may include induction coil 412 surrounding inner chamber 402 (adjacent to susceptors 409) and/or heating elements 413 surrounding outer chamber 403. For example, power sent to heating elements 413 may be controlled by a temperature regulator (not shown) electronically coupled to temperature sensing elements 410 and 411.

Individual print heads 401 may have similar or identical functionality as described for print heads 100, 200, and 300, For example, in some embodiments, inner chambers 402 may comprise inner nozzles 414 for exit of precursor vapor and/or nascent nanoparticle jets into outer chamber 403 through inner orifices 415. Outer chambers 403 comprise outer nozzles 416 and outer orifices 417, through which second jets may issue.

Individual print heads 401 of print head array 400 may be rigidly affixed relative to one another, so that the entire array may be translated as a single unit. Employment of print head array 400 may enable simultaneous printing of multiple identical patterns, providing greater coverage over an area of surface than a single print head, if desired. Thus, a particular pattern may be written over a target surface significantly more rapidly with print head array 400 than a single print head.

Figure 5:
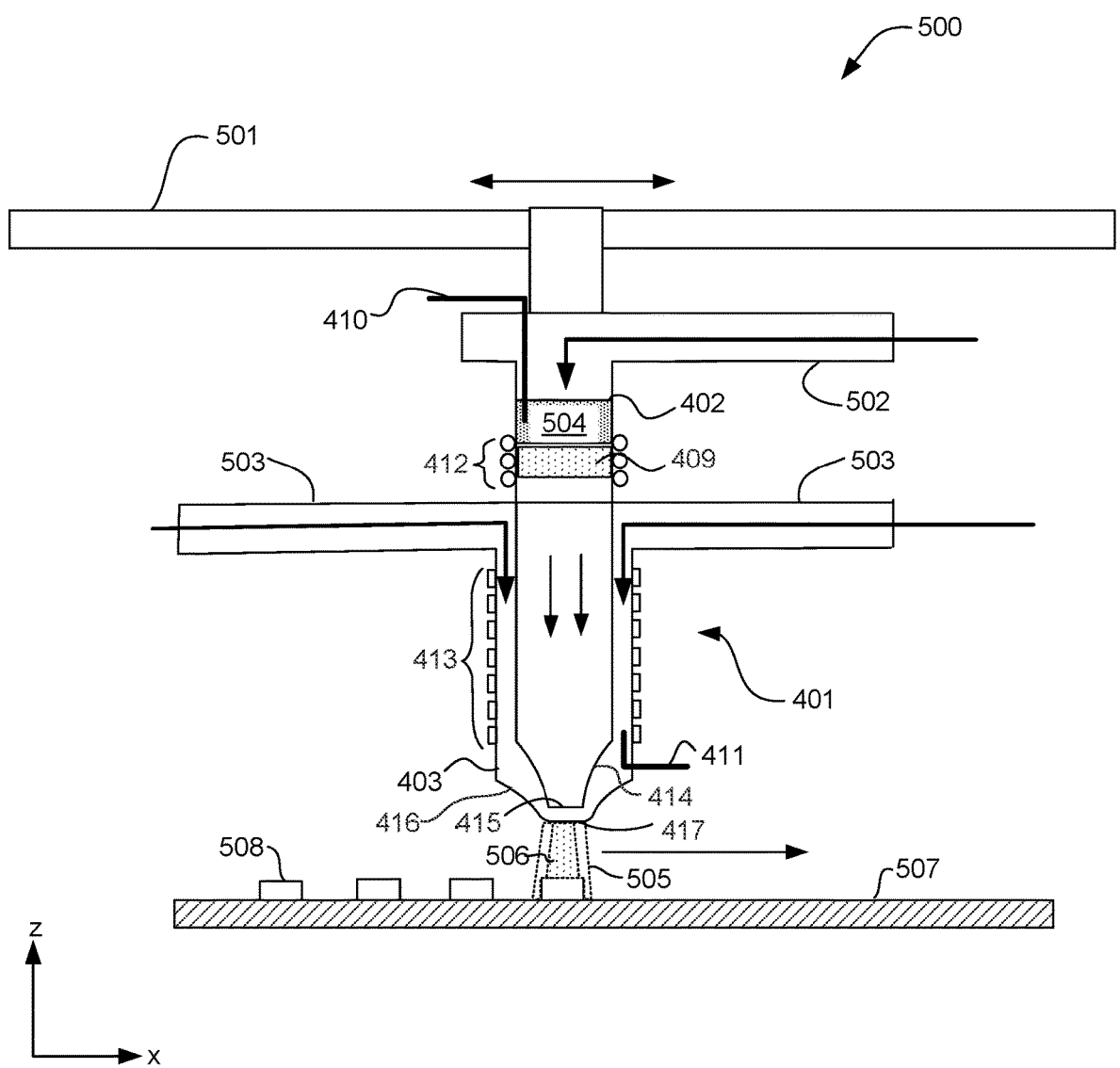
FIG. 5 illustrates a cross-sectional view in the x-z plane of a three-dimensional (3D) printer print head mechanism comprising a print head according to some embodiments of the disclosure.

FIG. 5 illustrates a cross-sectional view in the x-z plane of three-dimensional (3D) printer print head mechanism 500 comprising a print head according to some embodiments of the disclosure.

3D printer print head mechanism 500 comprises individual or multiple print heads 401 coupled to gantry 501. While shown as an individual unit in the illustrated embodiment, print head 401 may represent a print head array similar to print head array 400. Gantry 501 may translate print head 401 (or print head array 400) in a two- or three-dimensional pattern in a nanomaterial deposition apparatus. Inner chamber 402 is fluidically and mechanically coupled to distribution manifold 502. Distribution manifold 502 may be coupled to a reactive or inert carrier gas source, and introduce a gas flow into inner chamber 402 as indicated by the heavy arrow. In some embodiments, distribution manifold 502 may comprise flexible tubing to enable translation of print head 401 by gantry 501. In some embodiments, precursor substance 504 may be contained as a solid or liquid material within inner chamber 402. Precursor substance 504 may be adjacent to and/or in direct contact with susceptor 409. In the illustrated embodiment, susceptor 409 may be inductively heated by induction coil 412.

Similarly, outer chamber 403 may be fluidically and mechanically coupled to distribution manifold 503. Distribution manifold 503 may also be coupled to a source of inert or reactive gas, introducing a gas flow into outer chamber 403, as indicated by the heavy arrows. Vaporized precursor substance may be pushed through susceptor 409 by pressurization of the upper portion of inner chamber 402 (above susceptor 409) resulting from flow of carrier gas from distribution manifold 502. A mixture of precursor vapor and carrier gas flows down through inner chamber 402, as indicated by light arrows, toward inner nozzle 414. Precursor vapor may exit inner chamber 402 through inner orifice 415 into outer chamber 403 as a first jet. Precursor vapor may further react with and/or be diluted by the second gas introduced into outer chamber 403 by distribution manifold 503. A second jet, including sheath flow, may be generated within outer nozzle 416 and issue through outer orifice 417, as described above.

Temperature sensing element 410 may be optionally included within inner chamber 402 to monitor the temperature of susceptor 409. Temperature sensing element 410 may be a thermocouple or a resistive temperature detector (RTD). Temperature sensing element 410 may be electrically coupled to a driver for the susceptor irradiation source (e.g., an inductive heating controller, not shown). For example, the RF power intensity and/or duration supplied to induction coil 412 may be adjusted according to the temperature or rate of change of temperature measured by temperature sensing element 410. For example, the RF current may be pulsed, enabling a controlled rise and fall of the temperature of susceptor 409, and may generate well-defined plugs of vapor of precursor substance 504 that flow into the lower portion (e.g., lower portion 120 of chamber 102, FIG. 1B) and out the inner orifice 415 of inner chamber 402.

As noted above, outer chamber 403 may be coupled to distribution manifold 503. An inert or reactive gas may be introduced into chamber 403 through manifold 503 to which an inert or reactive carrier gas source is coupled. Distribution manifold 503 may also comprise flexible tubing to enable translation of print head 401 by gantry 501. Gas flow into chamber 403, indicated by the heavy arrows, may be metered by valves or pumps coupled to distribution manifold 503. Heating elements 413 and temperature sensing element 411 may be optionally included over and within chamber 403, respectively, for controlled heating of the gas flow within chamber 403. In-situ reactions within chamber 402 may generate a flow of nanoparticles as described above. The gas flow within outer chamber 403 may develop as a laminar flow, forming a sheath flow 505 over nanoparticle jet 506 expanding through outer orifice 417. Jet 506 may impinge on surface 507 below print head 401. In some embodiments, the gas flowing within outer chamber 403 is a reactive gas. Jet 506 may comprise unreacted vapor (e.g., from precursor substance 504) surrounded by sheath flow 505 of reactive gas. Surface 507 may be held at ambient temperature or below, or heated and/or comprise a catalytic coating to initiate surface reactions of jet gases, whereby nanoparticles may form heterogeneously.

Nanomaterials may be deposited to form nanostructured patterns 508 such as lines, mesas, or other shapes on surface 507 while print head 401 may be held stationary. Print head 401 may be translated by gantry 501 along surface 507 to write a pattern of nanomaterial structures over surface 507. Nanostructured patterns 508 may comprise compact films of nanoparticles.

Figure 6:
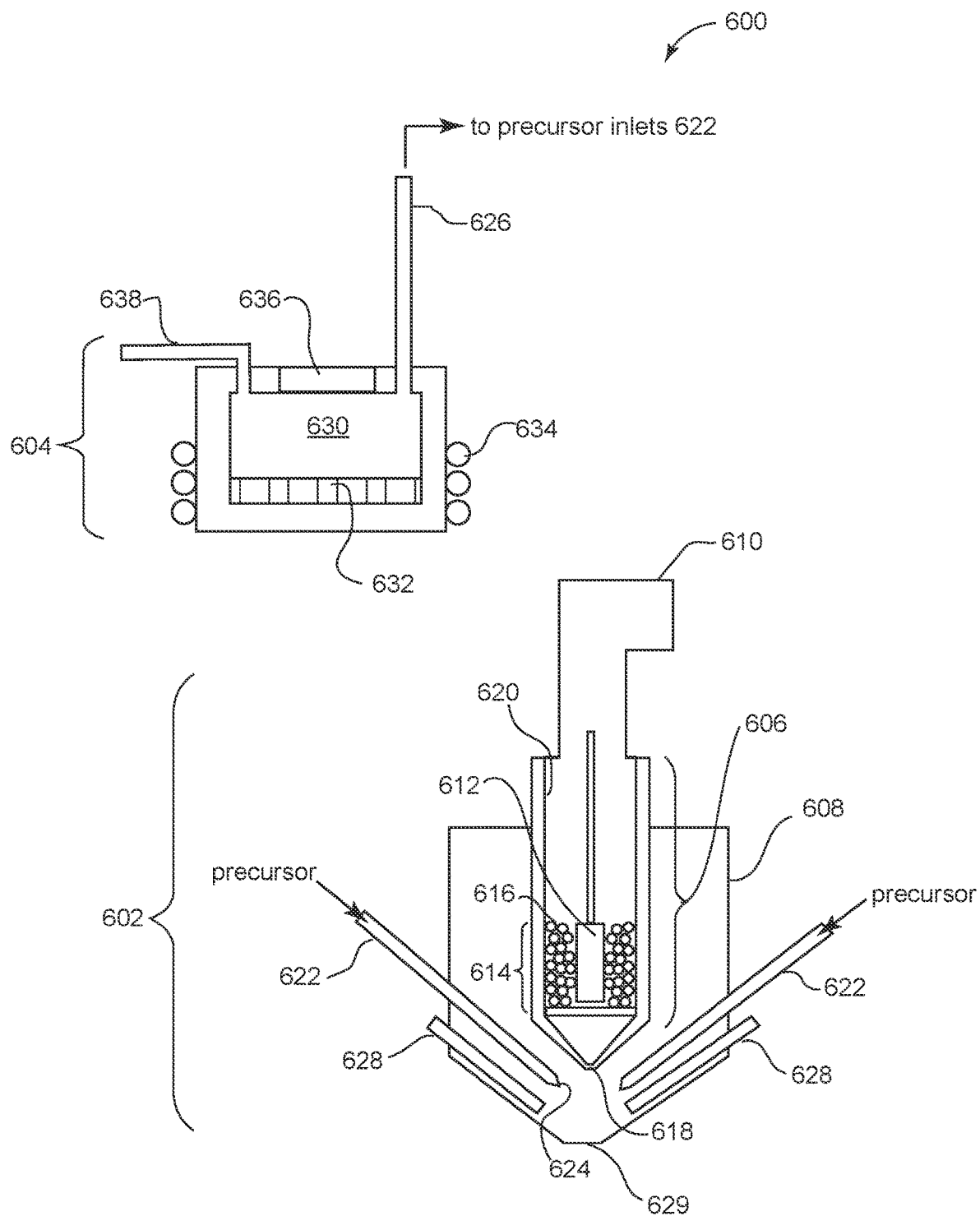
FIG. 6 illustrates a cross sectional view in the x-z plane of a print head assembly comprising a print head cartridge and an external precursor reservoir, according to some embodiments of the disclosure.

FIG. 6 illustrates a cross-sectional view in the x-z plane of print head assembly 600, comprising print head cartridge 602 and external precursor reservoir 604. In some embodiments, print head cartridge 602 and external precursor reservoir are physically separate components of print head assembly 600. Print head cartridge 602 may fluidically communicate with external precursor reservoir 604 (through external tubing, for example) as indicated by the arrows in the figure. Fluidic connections between print head cartridge 602 and external precursor reservoir 604 are described below.

Print head cartridge 602 comprises inner chamber 606 nested within outer chamber 608. Print head cartridge 602 further comprises gas inlet 610 that opens into inner chamber 606. Gas inlet 610 may enable coupling of print head cartridge 602 to an external carrier gas source (not shown). Print head cartridge 602 further comprises heater 612 within inner chamber 606. Packed bed 614 may be optionally included within inner chamber 606. Packed bed 614 may comprise a plurality of beads 616 packed about heater 612. In some embodiments, beads 616 may comprise a metal such as copper or stainless steel that may be heated to high temperatures. During operation of print head assembly 600, beads 616 of packed bed 614 may absorb heat generated by heater 612. Heated beads 616 may transfer heat from heater 612 to a gas introduced into inner chamber 606 through gas inlet 610 and flowing to outer chamber 608 through inner nozzle 618. The gas may be preheated by passing through packed bed 614 before entering outer chamber 608.

Inner chamber 606 may optionally include a layer of insulation 620 surrounding inner chamber 606. Insulation 620 may enable retention of heat within inner chamber 606 for more efficient heating of gas flowing within. Outer chamber 608 may comprise one or more precursor inlets 622. Precursor inlets 622 comprise nozzles 624 that may enable atomization of precursor vapor into a fine spray into outer chamber 608. Precursor inlets 622 may be fluidically coupled to external precursor reservoir 604 as indicated by the arrows. For example, precursor inlets 622 may be coupled to outlet 626 of external precursor reservoir 604 through external tubing (not shown).

Precursor vapor issuing from nozzles 624 of precursor inlets 622 may mix with heated carrier gas issuing as an inner jet from inner nozzle 618. Carrier gas may be inert or reactive. In implementations employing an inert carrier gas, such as argon, precursor vapor may mix with and be diluted by an inert carrier gas. Fluid dynamic conditions within print head assembly 600 may be controlled to create substantially laminar flow of gases flowing within outer chamber 608. High temperatures carried by the inert carrier gas may cause homogeneous decomposition of precursor vapor to form a dispersion of nascent solid nanoparticles within outer chamber 608. Solid nanoparticles may be entrained within the inert carrier gas.

In other implementations, precursor vapors may remain unreacted, but entrained in the inert carrier gas.

In implementations employing a reactive carrier gas, such as oxygen, vapors of unreacted precursor may mix and react with the carrier gas preheated by packed bed 614 within inner chamber 606. A homogeneous reaction between precursor vapor and the heated reactive carrier gas may occur within outer chamber 608. For example, the precursor may be oxidized to form nascent metal oxide nanoparticles within the gas phase.

Print head cartridge 602 may optionally comprise one or more sheath flow inlets 628. Sheath flow inlets 628 may introduce a second carrier gas into outer chamber 608, but close to outer orifice 629. The location of sheath flow inlets 628 near outer orifice 629 may enable laminar flow of sheath gases issuing from sheath flow inlets 628, to surround an inner jet of entrained nanoparticles. The sheath flow gas may be inert or reactive, such as nitrogen or hydrogen, for example, and may be employed to exclude ambient gases such as oxygen from deposition of unreacted vapor onto a target surface.

In some embodiments, external precursor reservoir 604 comprises precursor reservoir 630. Precursor reservoir 630 may contain a nongaseous precursor substance (not shown). In some embodiments, external precursor reservoir 604 may comprise a susceptor 632 below precursor reservoir 630. During operation, susceptor 632 may be operable to inductively heat under the influence of an RF electromagnetic field emanating from induction coil 634. Heating of susceptor 632 may enable heat transfer from susceptor 632 to the precursor substance contained within precursor reservoir 630.

In some embodiments, external precursor reservoir 604 may comprise optical window 636. Optical window 636 may comprise an infrared transparent material, such as fused silica, silicate glasses, or silicon. Optical window 636 may be operational to pass laser light (e.g., IR light) to impinge on a nongaseous precursor substance contained within precursor reservoir 630. If desired, the precursor substance may be heated and vaporized by laser excitation in lieu of inductive heating. For example, laser heating may be more rapid than inductive heating of some precursor substances. The precursor substance may undergo one or two phase changes to arrive at a vapor state. For example, solid tungsten hexacarbonyl may directly sublimate into a vapor, whereas zirconium tert-butoxide may undergo melting followed by boiling.

In some embodiments, external precursor reservoir 604 may comprise gas inlet 638. In some embodiments, gas inlet 638 may be coupled to an inert carrier gas source. Gas inlet 638 may be operable to introduce a carrier gas into precursor reservoir 630 for carrying out precursor vapor through outlet 626 to precursor inlets 622.

Figure 7A:
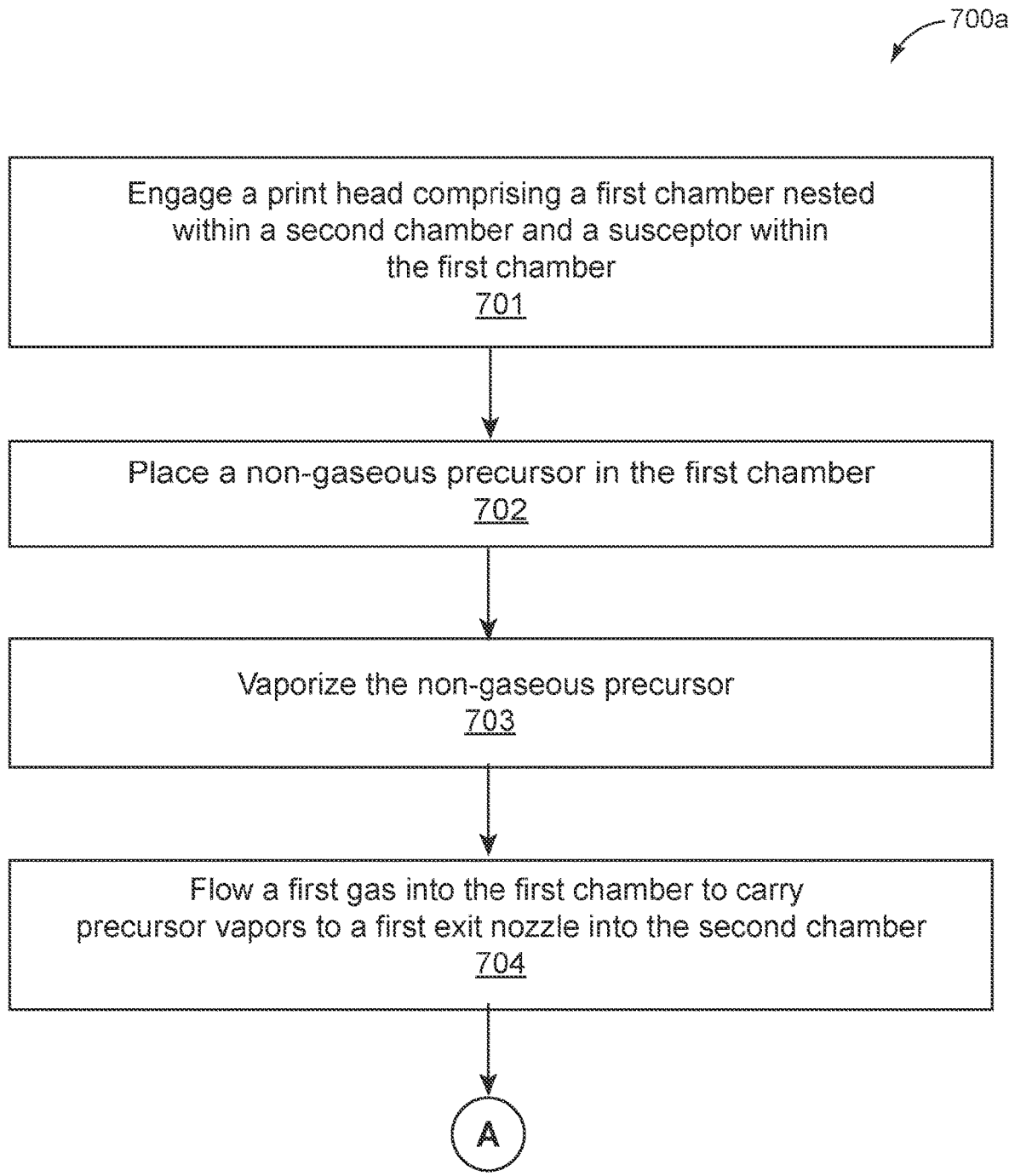
FIG. 7A illustrates a process flow chart illustrating an exemplary method for using a print head according to embodiments of the disclosure.

FIG. 7A shows process flow chart 700a illustrating an exemplary method for using a print head according to embodiments of the disclosure.

At operation 701, a print head is provided, wherein the print head may be print head 100, 200, or 300, for example, comprising an inner chamber and an outer chamber (e.g., inner chamber 101 and outer chamber 102) and a susceptor (e.g., susceptor 115) within the inner chamber.

At operation 702, a precursor substance may be placed within an upper portion of the first chamber, above the susceptor, for example. In some embodiments, the susceptor may be configured to contain a nongaseous precursor within an upper portion of the inner chamber (e.g., inner chamber 101). Heating of the susceptor may cause the material to vaporize or sublimate, producing a gaseous reactant that may flow into a second portion of the chamber through openings or pores within the susceptor structure. For example, the susceptor may be a porous plate separating the inner chamber into an upper portion and a lower portion (e.g., upper portion 119 and lower portion 120, see FIG. 1B). The precursor substance may be introduced into the upper portion in liquid or solid form, whereby the material is adjacent to the susceptor. In the liquid or solid state, the material may not penetrate through the susceptor and flow into the lower portion. Upon heating by the susceptor, the material may vaporize or sublimate into a vapor state, capable of flowing under pressure of a carrier gas introduced into the inner chamber. For example, a mixture of precursor vapor and carrier gas through the pore structure of the susceptor plate and into the lower portion.

In some embodiments, the precursor substance may be pure liquid or solid substance. In some embodiments, the precursor substance may be a solution comprising the precursor substance in a dissolved state. For example, the precursor substance may be tungsten hexacarbonyl ($W(CO)_6$), which is a solid at room temperature (mp 170° C.). In another example, a precursor substance may be zirconium tert-butoxide ($Zr[C_4H_{10}O]_4$), which is a liquid at room temperature (bp 81° C.).

At operation 703, the precursor may be sublimated or vaporized by heating the susceptor. The susceptor may be heated by induction of RF energy or by optical energy transfer. For example, RF power may be applied to an induction coil (e.g., induction coil 112) surrounding and upper portion (e.g., upper portion 119) of the inner chamber of the print head. In some embodiments, the susceptor may comprise a metal that may be inductively heated (e.g., copper, stainless steel). In some embodiments, a metal may develop substantial temperatures when exposed to a high-frequency alternating electromagnetic field developed by an electromagnet coil disposed on the exterior of the sidewall of the first chamber in the vicinity of the susceptor. For example, an AC current ranging from 50 kilohertz (kHz) to 500 kHz may be employed to an induction coil surrounding the susceptor. In optically heated embodiments, the susceptor may comprise a metal (e.g., steel) or dielectric material (e.g., black titania) having a suitable infrared absorptivity that may be heated by an infrared laser light source having a suitable wavelength. For example, the susceptor may comprise an optical material (e.g., black titania) that absorbs strongly across the infrared spectrum. The optical material may optionally have a low heat capacity, permitting rapid temperature rise when irradiated by the IR light.

Alternatively, the inner chamber may comprise an optical window comprising a material that is at least partially transparent to particular wavelengths of infrared (IR) or visible light (e.g., silicate glass, fused silica, or silicon). The IR or visible light may be directed to the optical window by one or more IR or visible lasers, whereby the IR or visible light may penetrate the interior of the chamber and impinge on the susceptor. For example, the susceptor may be heated by laser light, for example, IR laser light having a wavelength of approximately 1 micron may be employed. A Nd:YAG laser may be a suitable laser source, for example. A suitably powerful diode laser may also be employed.

At operation 704, a first gas is caused to flow in the inner chamber. In some embodiments, the first gas is an inert carrier gas. The first gas may transport vaporized precursor to the nozzle of the inner chamber (e.g., inner nozzle 106 or 414, shown in FIGS. 1A, 1B, 4). The mixture of precursor vapor and first gas may issue from the nozzle of the inner chamber into the outer chamber, just above the second nozzle (e.g., inner nozzle 106).

In some implementations, the first gas may react with the precursor vapor, forming solid nanoparticles in situ within the inner chamber. In other implementations, the first gas may be inert and carry the precursor vapor into the outer chamber.

Printing of nanostructured film patterns may be controlled by heating and cooling of the susceptor. For example, flow of precursor vapor may be caused to cease by removing the electromagnetic energy from the susceptor. By switching off the AC current within the inductive heating coil and the exterior of the inner chamber, the susceptor may rapidly cool by conductive and convective heat transfer. As the susceptor temperature falls below a threshold value, the reactive material ceases to generate a vapor. Advantageously, the EM energy (optical or electrical) may be switched on and off to control duration and rate of deposition. For example, the EM energy may be pulsed and/or amplitude-modulated to control susceptor temperature and heating duration. For example, thickness and morphology of nanostructured films printed on two-dimensional or three-dimensional surfaces may be tailored by controlling reaction and deposition rates of pre-formed nanoparticles or of gaseous reaction products or unreacted materials that are deposited by the jet onto a preheated and/or catalytic surface. Advantageously, the tailored film may be written as a pattern onto the surface by translation of the print head.

Deposition of material from the print head may be metered by the rapid heating and cooling of the susceptor, eliminating need of moving parts such as valves. This is distinguished from conventional ink-jet print head technology that also employs heat-induced vaporization to deposit droplets of ink onto a page or other surface. In the case of conventional ink-jet print heads, resistive heating may be used by DC or AC current flow through electrically resistive structures within the interior chambers of the print head to rapidly heat the solvent carrier, creating vapor bubbles. The vapor remains contained as bubbles within the chamber, and does not flow between chambers or exit the print head. Dynamically, resistive elements within the conventional print head may be heated, causing expansion of vapor bubbles that eject liquid ink from the print head by volume displacement.

The precursor may be vaporized by controlling the flow and/or intensity of electromagnetic energy transferred to a susceptor. The vaporized precursor may be entrained within a carrier gas in turbulent or laminar flow through a second chamber surrounding the first (e.g., innermost) chamber. In some embodiments, inert gas introduced into the outer chamber may develop a sheath flow as it flows over a coaxial first (innermost) chamber toward the outer nozzle, surrounding an emerging jet of the vaporized reactive material flowing out of the nozzle of the first chamber. A sheath of inert gas may flow out of the outer nozzle with the reactive vapor jet. In part, the inert gas sheath may also create a venturi effect, producing a low pressure (e.g., below atmospheric pressure) region ahead of the reactive jet, enhancing expansion of the reactive jet from the inner nozzle.

In some implementations, the inert gas sheath may prevent reactive material within the jet from contacting and potentially fouling surfaces of the outer chamber. In some embodiments, an electric heating jacket may surround the sidewalls of the second chamber to provide heated surfaces to thwart nucleation on the inner surface of the sidewalls. In an example, the heating jacket may comprise flexible resistive heating elements encased within a polymer.

The density of nanoparticles within the jet may be controlled by reactant concentration, flow rate, and jet temperature. The disclosed print head may be in proximity of a two-dimensional or three-dimensional surface upon which the nanoparticle jet may impinge. Formation of compact or porous solid films may result from deposition of nanoparticles in high or low density. The target surface may be heated or have a catalytic coating as noted above, to enhance nanoparticle growth and coalescence to control film crystallinity.

Also as noted above, heating of the susceptor may be momentarily reduced or interrupted, for example by pulsing electromagnetic irradiation of the susceptor, to momentarily reduce or stop the flow of the primary reactant from the first chamber for a prescribed time period. For example, reducing or halting formation of primary reactant vapors may decrease or stop nanoparticle deposition onto the target. The writing of patterns of deposited materials by the disclosed print head may be enabled by controlling susceptor irradiation. Flow of secondary reactants may also be similarly controlled or metered by mechanical valves.

After operation 704, process flow chart 700a may reach a branching point labelled "A." From point "A," process flow chart 700a may branch to one of several process options. These options are shown in process flow charts 700b, 700c, and 700d shown in FIGS. 7B, 7C, and 7D, respectively.

Figure 7B:
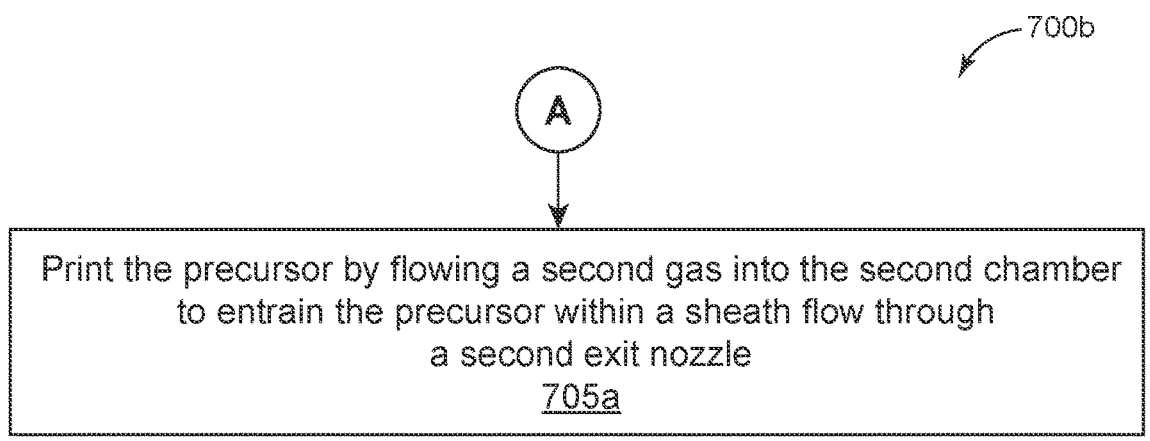
FIG. 7B illustrates a process flow chart illustrating an alternative exemplary method for direct printing of nanostructured films using a print head according to some embodiments of the disclosure.

For example, FIG. 7B illustrates process flow chart 700b. Process flow chart option comprises initial operations 701-704 from process flow chart 700a (FIG. 7A), further comprising optional operation 705a appended to operations 701 to 704. At operation 705a, a second gas is caused to flow in the outer chamber. The second gas may be an inert or reactive gas. For example, the second gas may be argon or nitrogen. Examples of reactive gases may be oxygen, hydrogen, water vapor, ammonia, hydrazine, nitrogen oxides. The second gas may react with the entrained precursor vapor within the outer chamber, forming nascent nanoparticles directly within the gas phase. The nanoparticles may be entrained within the flow of the second gas, exiting out of the second nozzle. In some implementations, a second jet is formed as the gases exit to the exterior from the second nozzle. The second gas may form a sheath flow around the first (inner) jet entrained within a mixture of the first gas and the second gas.

The second jet carrying nascent nanoparticles may issue from the second nozzle and impinge on a target surface. Nanoparticles may be deposited directly onto the target surface. Patterns may be directly written to the target surface by scanning the print head.

Figure 7C:
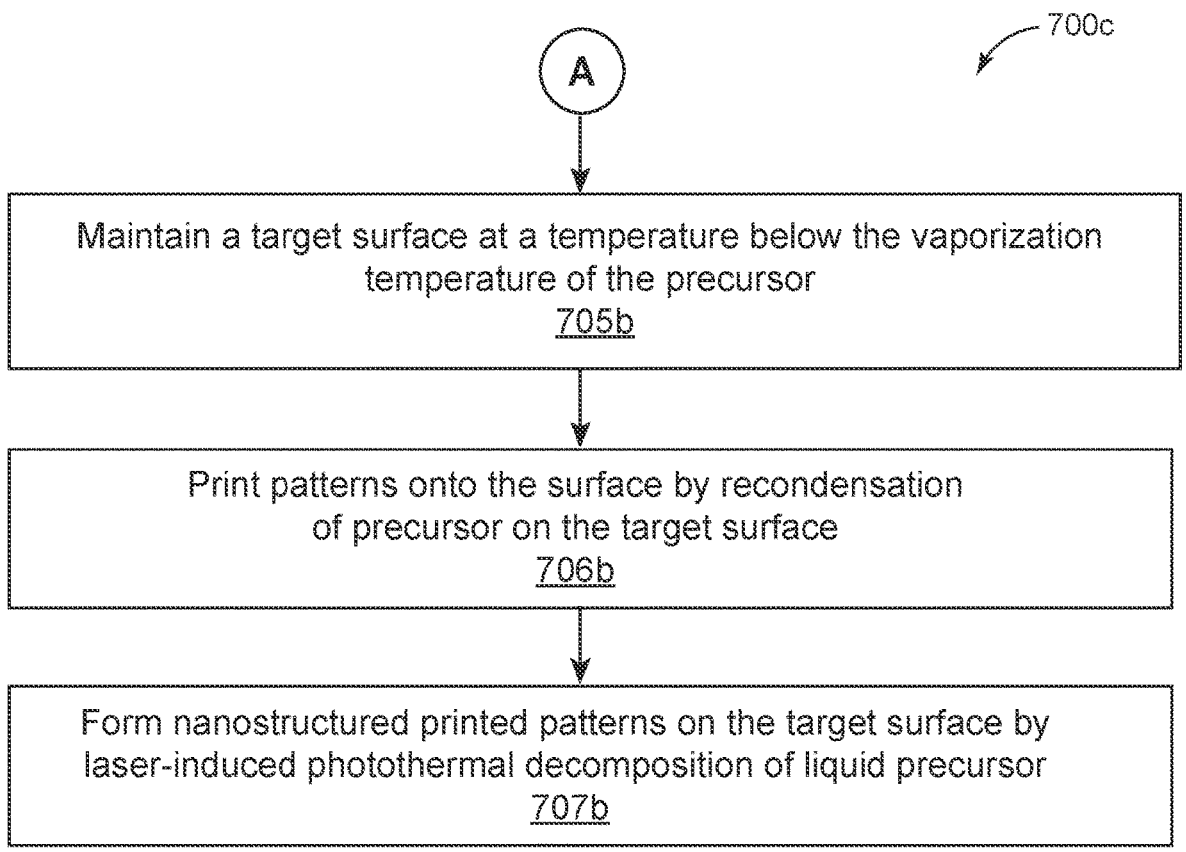
FIG. 7C illustrates a process flow chart illustrating an alternative exemplary method for laser-assisted printing of nanostructured films using a print head according to some embodiments of the disclosure.

FIG. 7C illustrates process flow chart 700c, comprising initial operations 701 to 704 from process flow chart 700a, and further comprising optional operations 705b, 706b and 707b appended in that order to operations 701 to 704. At operation 705b, a target surface is maintained at a temperature that is lower than the vaporization temperature of the precursor substance. Referring to operation 704, the second gas may be an inert gas that forms a sheath flow around the first (e.g., inner) jet to form a second (e.g., outer) jet. The second jet may carry unreacted precursor vapor within the inner jet.

At operation 706b, the second jet is caused to impinge on the target surface. The temperature of the target surface may be held at a value that is at or below the condensation temperature of the precursor substance. The vapor of the precursor substance may condense upon contact with the cooler surface, forming deposited liquid films. To form written patterns, the print head may be scanned over the surface and the vapor jet (e.g., the second jet) released from the second nozzle of the print head by opening a valve to flow first and second gases, or by intermittently heating the susceptor to inject a plug of precursor vapor into the gas stream.

At operation 707b, an infrared (IR) laser may be scanned over the printed liquid films of precursor vapor simultaneously with deposition of the precursor or subsequently. Heat from the IR laser may induce a surface reaction of the precursor substance. The surface reaction may be a photothermal decomposition of the precursor, induced by laser heating. For example, tungsten hexacarbonyl (W(CO)$_6$) may decompose in the presence of oxygen, for example, or in the presence of another oxidizing gas such as water vapor to form nanostructured patterns comprising tungsten oxide (WO$_3$) nanoparticles. Oxygen may be introduced in the first gas or the second gas. Metallic tungsten (zero oxidation state) nanoparticle films may also be formed photothermally by laser heating of precursor liquid films in the presence of hydrogen or another reducing gas, such as carbon monoxide. As an example, hydrogen may be introduced into the inner chamber as a first gas comprising a mixture of hydrogen and nitrogen or hydrogen and argon. Similarly, the second gas may comprise argon or nitrogen as a sheath gas to exclude oxygen from the reaction site.

Other precursor substances may be employed to produce printed nanostructured films. For example, yttrium oxide (Y$_2$O$_3$) nanoparticle films may be formed by photothermal decomposition of yttrium (III) tris(2,2,6,6-tetramethyl-3,5-heptanedionate), as noted above. In another example, zirconia (ZrO$_2$) nanoparticle films may be formed by photothermal decomposition of zirconium tert-butoxide.

Figure 7D:
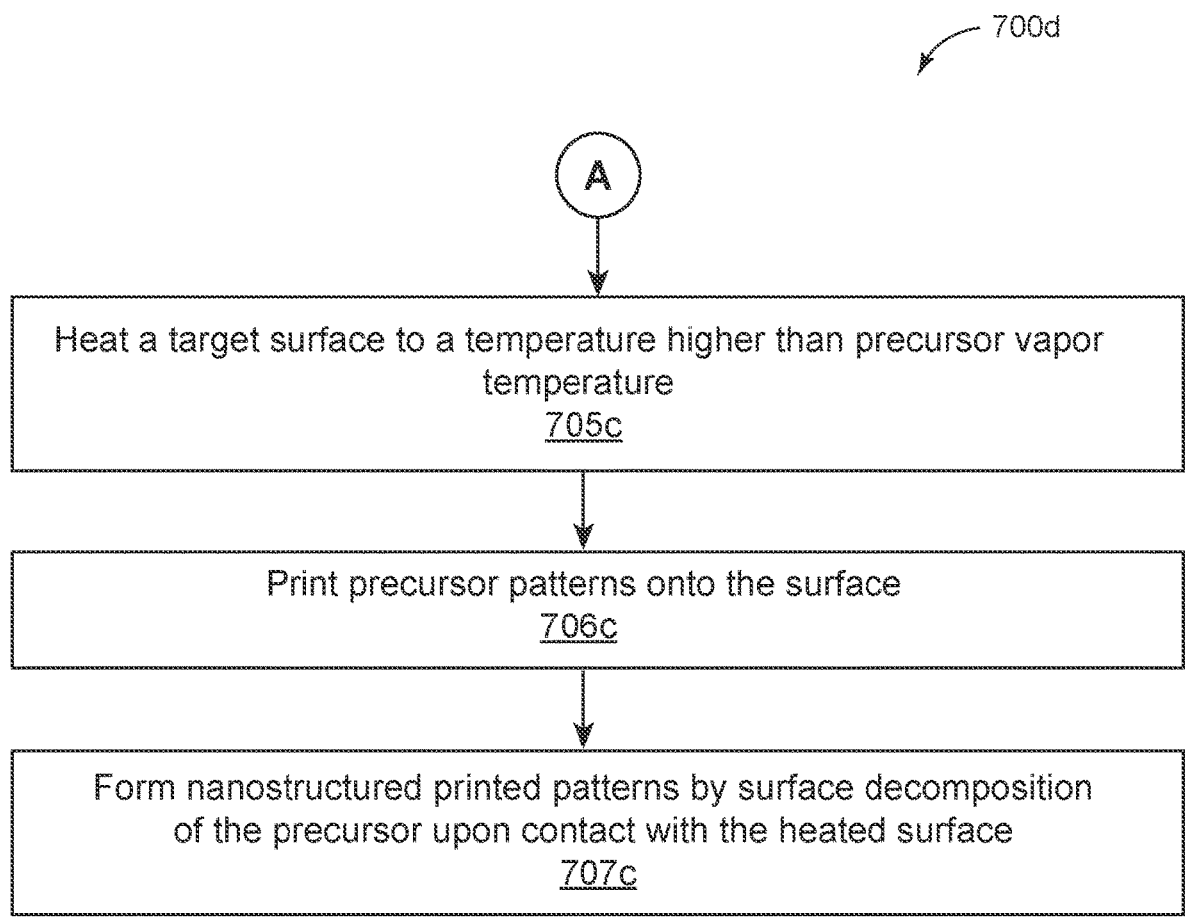
FIG. 7D illustrates a process flow chart illustrating an alternative exemplary method for surface formation of nanostructured films using a print head according to some embodiments of the disclosure.

FIG. 7D illustrates process flow chart 700d, comprising initial operations 701 to 704 from process flow chart 700a, and further comprising optional operations 705c, 706c, and 707c appended in that order to operations 701 to 704.

At operation 705c, a target surface is heated to the decomposition temperature of the precursor. For example, the target surface may be heated to at last 170° C. for decomposing tungsten hexacarbonyl to the corresponding oxide.

At operation 706c, unreacted precursor vapor may be printed onto the heated target surface by formation of a precursor jet from the print head as described above. At operation 707c, the precursor may decompose upon contact to the corresponding oxide or metal.

The following examples are provided that illustrate the various embodiments. The examples can be combined with other examples. As such, various embodiments can be combined with other embodiments without changing the scope of the invention.

Example 1 is a print head, comprising a first chamber nested within a second chamber, wherein the first chamber comprises a first nozzle, wherein the second chamber comprises a second nozzle, and wherein the first nozzle is substantially coaxial with the second nozzle; and a susceptor to convert electromagnetic energy to heat within the first chamber, wherein the susceptor is between an upper portion and a lower portion of the first chamber, the susceptor comprising one or more openings extending between the upper portion and the lower portion.

Example 2 includes all the features of example 1, wherein the susceptor comprises a plate comprising a first surface over a second surface, the first surface substantially parallel to the second surface, and wherein one or more openings extend between the first surface and the second surface.

Example 3 includes all the features of example 1, wherein the susceptor comprises a packed bed, the packed bed comprising a plurality of particles.

Example 4 includes all the features of example 3, wherein the packed bed is within a cartridge having one or more sidewalls and a bottom wall, the bottom wall having one or more openings.

Example 5 includes all the features of example 4, wherein the one or more sidewalls have one or more fins extending along the one or more sidewalls, and wherein the one or more fins extend into the packed bed.

Example 6 includes all the features of example 1, wherein an induction coil surrounds the susceptor, wherein a sidewall of the first chamber is between an induction coil and the susceptor.

Example 7 includes all the features of example 6, wherein the sidewall comprises a metallic or a dielectric material.

Example 8 includes all the features of example 6, wherein an electric heating element is around the second chamber.

Example 9 includes all the features of example 1, wherein one or more sidewalls of the first chamber comprises an optical window, the optical window comprising a material at least partially transparent to infrared light.

Example 10 includes all the features of example 9, wherein the second chamber is within a third chamber having a third nozzle below the third chamber, and wherein the second chamber is coaxial with the third chamber.

Example 11 includes all the features of example 1, further comprising a temperature sensing element adjacent to the susceptor.

Example 12 includes all the features of example 1, wherein the upper portion of the first chamber comprises an optical window adjacent to the susceptor, and wherein the optical window is at least partially transparent to infrared light.

Example 13 is a nanomaterial deposition apparatus comprising at least one print head, comprising a first chamber nested within a second chamber, wherein the first chamber comprises a first nozzle, wherein the second chamber comprises a second nozzle, and wherein the first nozzle is substantially coaxial with the second nozzle; and a susceptor to convert electromagnetic energy to heat within the first chamber, wherein the susceptor is between an upper portion and a lower portion of the first chamber, the susceptor comprising one or more openings extending between the upper portion and the lower portion; and a temperature sensing element adjacent to the susceptor, wherein a reactive material is within the first chamber and adjacent to the susceptor, and the second chamber is coupled to a reactive or an inert gas source.

Example 14 includes all the features of example 13, wherein the first chamber is coupled to a first gas source and the second chamber is coupled to a second gas source, wherein the first gas source contains an inert gas, and wherein the second gas source contains an inert gas or a reactive gas.

Example 15 includes all the features of examples 13 or 14, wherein a first heating element is an inductive heating coil surrounding the susceptor, wherein a sidewall is between the inductive heating coil and the susceptor, and wherein the temperature sensing element and the inductive heating coil are electrically coupled to a temperature controller.

Example 16 includes all the features of any one of examples 13, 14, or 15, wherein the susceptor is optically coupled to an infrared laser light source.

Example 17 is a method for using a nanomaterial deposition apparatus, comprising engaging a print head comprising a first chamber nested within a second chamber; and a susceptor, wherein the susceptor is between an upper portion and a lower portion of the first chamber, and wherein the susceptor comprises one or more openings extending through the susceptor between the upper portion and the lower portion, wherein the one or more openings fluidically couple the upper portion and the lower portion; placing a nongaseous precursor within the upper portion of the first chamber; heating the susceptor to a target temperature, wherein electromagnetic energy is directed to the susceptor to raise a temperature of the susceptor to a vaporization temperature of the nongaseous precursor within the first chamber; flowing a first gas into the first chamber to carry a precursor vapor to a first nozzle to form a first jet; and flowing a second gas into the second chamber, wherein the second gas flows through a second nozzle to form a second jet.

Example 18 includes all the features of example 17, wherein flowing a gas into the second chamber comprises flowing a gas comprising a reactive gas into the second chamber, and wherein the nongaseous precursor reacts with the reactive gas within the second chamber.

Example 19 includes all the features of example 17, wherein flowing a gas into the second chamber comprises flowing an inert gas into the second chamber, wherein the inert gas forms a sheath flow around a jet comprising a vapor of the nongaseous precursor.

Example 20 includes all the features of example 17, wherein heating the susceptor to a target temperature comprises heating the susceptor by inductive heating or by optical heating.

Example 21 includes all the features of any one of examples 17, 18, 19, or 20, further comprising maintaining a target surface at a first condensation temperature, wherein the first condensation temperature is lower than a condensation temperature of the nongaseous precursor; printing one or more patterns comprising the nongaseous precursor on the target surface, wherein the nongaseous precursor is re-condensed upon contact with the target surface to a liquid state; and forming one or more solid state patterns on the target surface by laser-assisted photothermal decomposition of the nongaseous precursor.

Example 22 includes all the features of any one of examples 17, 18, 19, 20, or 21, further comprising maintaining a target surface at a first decomposition temperature, wherein the first decomposition temperature is greater than a decomposition temperature of the nongaseous precursor;

printing one or more patterns comprising the nongaseous precursor on the target surface, and forming one or more solid state patterns on the target surface, wherein the nongaseous precursor is decomposed upon contact with the target surface to form a solid material.

Besides what is described herein, various modifications may be made to the disclosed embodiments and implementations thereof without departing from their scope. Therefore, illustrations of embodiments herein should be construed as examples only, and not restrictive to the scope of the present disclosure. The scope of the invention should be measured solely by reference to the claims that follow.

We claim:

1. A print head, comprising:
    a first chamber nested within a second chamber, wherein the first chamber comprises a first nozzle, wherein the second chamber comprises a second nozzle, and wherein the first nozzle is substantially coaxial with the second nozzle; and
    a susceptor to convert electromagnetic energy to heat within the first chamber, wherein the susceptor is between an upper portion and a lower portion of the first chamber, the susceptor comprising one or more openings extending between the upper portion and the lower portion.

2. The print head of claim 1, wherein the susceptor comprises a plate comprising a first surface over a second surface, the first surface substantially parallel to the second surface, and wherein the one or more openings extend between the first surface and the second surface.

3. The print head of claim 1, wherein the susceptor comprises a packed bed, the packed bed comprising a plurality of particles.

4. The print head of claim 3, wherein the packed bed is within a cartridge having one or more sidewalls and a bottom wall, the bottom wall having the one or more openings.

5. The print head of claim 4, wherein the one or more sidewalls have one or more fins extending along the one or more sidewalls, and wherein the one or more fins extend into the packed bed.

6. The print head of claim 1, wherein an induction coil surrounds the susceptor, and wherein a sidewall of the first chamber is between the induction coil and the susceptor.

7. The print head of claim 6, wherein the sidewall comprises a metallic or a dielectric material.

8. The print head of claim 6, wherein an electric heating element is around the second chamber.

9. The print head of claim 1, wherein one or more sidewalls of the first chamber comprises an optical window, the optical window comprising a material being at least partially transparent to infrared light.

10. The print head of claim 9, wherein the second chamber is within a third chamber having a third nozzle below the third chamber, and wherein the second chamber is coaxial with the third chamber.

11. The print head of claim 1, further comprising a temperature sensing element adjacent to the susceptor.

12. The print head of claim 1, wherein the upper portion of the first chamber comprises an optical window adjacent to the susceptor, and wherein the optical window is at least partially transparent to infrared light.

13. A nanomaterial deposition apparatus comprising:
    at least one print head, comprising:
        a first chamber nested within a second chamber, wherein the first chamber comprises a first nozzle, wherein the second chamber comprises a second nozzle, and wherein the first nozzle is substantially coaxial with the second nozzle; and
        a susceptor to convert electromagnetic energy to heat within the first chamber, wherein the susceptor is between an upper portion and a lower portion of the first chamber, the susceptor comprising one or more openings extending between the upper portion and the lower portion; and
    a temperature sensing element adjacent to the susceptor, wherein a reactive material is within the first chamber and adjacent to the susceptor, and the second chamber is coupled to a reactive or an inert gas source.

14. The nanomaterial deposition apparatus of claim 13, wherein the first chamber is coupled to a first gas source and the second chamber is coupled to a second gas source, wherein the first gas source contains an inert gas, and wherein the second gas source contains an inert gas or a reactive gas.

15. The nanomaterial deposition apparatus of claim 13, wherein a first heating element is an inductive heating coil surrounding the susceptor, wherein a sidewall is between the inductive heating coil and the susceptor, and wherein the temperature sensing element and the inductive heating coil are electrically coupled to a temperature controller.

16. The nanomaterial deposition apparatus of claim 13, wherein the susceptor is optically coupled to an infrared laser light source.

17. A method for using a nanomaterial deposition apparatus, comprising:
    engaging a print head comprising:
        a first chamber nested within a second chamber, wherein the first chamber comprises a first nozzle, wherein the second chamber comprises a second nozzle, and wherein the first nozzle is substantially coaxial with the second nozzle; and
        a susceptor, wherein the susceptor is between an upper portion and a lower portion of the first chamber, wherein the susceptor comprises one or more openings extending through the susceptor between the upper portion and the lower portion, and wherein the one or more openings fluidically couple the upper portion and the lower portion;
    placing a nongaseous precursor within the upper portion of the first chamber;
    heating the susceptor to a target temperature, wherein electromagnetic energy is directed to the susceptor to raise a temperature of the susceptor to a vaporization temperature of the nongaseous precursor within the first chamber;
    flowing a first gas into the first chamber to carry a precursor vapor to a first nozzle to form a first jet; and
    flowing a second gas into the second chamber, wherein the second gas flows through a second nozzle to form a second jet.

18. The method of claim 17, wherein flowing a gas into the second chamber comprises flowing a gas comprising a reactive gas into the second chamber, and wherein the nongaseous precursor reacts with the reactive gas within the second chamber.

19. The method of claim 17, wherein flowing a gas into the second chamber comprises flowing an inert gas into the second chamber, and wherein the inert gas forms a sheath flow around a jet comprising a vapor of the nongaseous precursor.

20. The method of claim 17, wherein heating the susceptor to a target temperature comprises heating the susceptor by inductive heating or by optical heating.

21. The method of claim 17, further comprising:

maintaining a target surface at a first condensation temperature, wherein the first condensation temperature is lower than a condensation temperature of the nongaseous precursor;

printing one or more patterns comprising the nongaseous precursor on the target surface, wherein the nongaseous precursor is recondensed upon contact with the target surface to a liquid state; and forming one or more solid state patterns on the target surface by laser-assisted photothermal decomposition of the nongaseous precursor.

22. The method of claim 17, further comprising:

maintaining a target surface at a first decomposition temperature, wherein the first decomposition temperature is greater than a decomposition temperature of the nongaseous precursor;

printing one or more patterns comprising the nongaseous precursor on the target surface, and forming one or more solid state patterns on the target surface, wherein the nongaseous precursor is decomposed upon contact with the target surface to form a solid material.

* * * * *